(12) United States Patent
Peniston et al.

(10) Patent No.: US 8,240,230 B2
(45) Date of Patent: Aug. 14, 2012

(54) PEDAL SENSOR AND METHOD

(75) Inventors: Chuck Peniston, Quakertown, PA (US); Sean Rick, Schnecksville, PA (US); Jan Vondras, East Norriton, PA (US)

(73) Assignee: Kongsberg Automotive Holding ASA, Inc., Kongsberg (NO)

( * ) Notice: Subject to any disclaimer, the term of this patent is extended or adjusted under 35 U.S.C. 154(b) by 1377 days.

(21) Appl. No.: 11/333,530

(22) Filed: Jan. 18, 2006

(65) Prior Publication Data

US 2006/0169093 A1    Aug. 3, 2006

Related U.S. Application Data

(60) Provisional application No. 60/644,884, filed on Jan. 18, 2005, provisional application No. 60/693,845, filed on Jun. 24, 2005, provisional application No. 60/686,642, filed on Jun. 2, 2005.

(51) Int. Cl.
| | |
|---|---|
| *G05G 1/30* | (2008.04) |
| *G01B 7/00* | (2006.01) |
| *G01B 7/14* | (2006.01) |
| *G01B 7/30* | (2006.01) |
| *G01R 33/025* | (2006.01) |

(52) U.S. Cl. ............... 74/512; 74/513; 74/514; 74/560; 324/207.12; 324/207.13; 324/207.2

(58) Field of Classification Search ............ 74/512–514, 74/560, 564; 324/207.2, 207.12, 207.13; 29/595

See application file for complete search history.

(56) References Cited

U.S. PATENT DOCUMENTS

| | | | |
|---|---|---|---|
| 3,554,096 A | 1/1971 | DeJager |
| 3,576,379 A | 4/1971 | Parise |
| 3,946,691 A | 3/1976 | Freeman |
| 4,011,469 A | 3/1977 | Chapron |
| 4,060,144 A | 11/1977 | Teti |
| 4,086,533 A | 4/1978 | Ricouard et al. |
| 4,112,885 A | 9/1978 | Iwata et al. |
| 4,133,407 A | 1/1979 | Schantz |
| 4,134,030 A | 1/1979 | Pace |
| 4,138,979 A | 2/1979 | Taplin |
| 4,204,158 A | 5/1980 | Ricouard et al. |
| 4,218,659 A | 8/1980 | Arai |
| 4,228,878 A | 10/1980 | Kisami |
| 4,275,291 A | 6/1981 | Feller |
| 4,278,059 A | 7/1981 | Collonia |
| 4,313,408 A | 2/1982 | Collonia |
| 4,313,515 A | 2/1982 | Mann et al. |
| 4,319,658 A | 3/1982 | Collonia et al. |

(Continued)

FOREIGN PATENT DOCUMENTS

EP        0961100 A2    12/1999

(Continued)

*Primary Examiner* — Vinh T. Luong

(74) *Attorney, Agent, or Firm* — Howard & Howard Attorneys PLLC

(57) ABSTRACT

An electronic pedal assembly including a treadle, a pedal arm connected to the treadle, and a rotor assembly about which the pedal arm rotates. The assembly also includes one or more Hall sensors positioned within a cavity in the rotor assembly and one or more magnets that fixedly attached to the rotor assembly. The Hall sensors detect the position of the treadle by monitoring the positions of the magnets. Also, a method of monitoring an electronic pedal assembly using one or more magnets and one or more Hall sensors.

14 Claims, 18 Drawing Sheets

U.S. PATENT DOCUMENTS

| | | | |
|---|---|---|---|
| 4,336,857 A | 6/1982 | Hunt | |
| 4,354,071 A | 10/1982 | Pietschmann | |
| 4,364,022 A | 12/1982 | Melocik et al. | |
| 4,373,486 A | 2/1983 | Nichols et al. | |
| 4,380,799 A | 4/1983 | Allard et al. | |
| 4,438,398 A | 3/1984 | Maruo et al. | |
| 4,493,303 A | 1/1985 | Thompson et al. | |
| 4,505,151 A | 3/1985 | Sauerschell et al. | |
| 4,510,906 A | 4/1985 | Klatt | |
| 4,519,360 A | 5/1985 | Murakami | |
| 4,519,361 A | 5/1985 | Murakami | |
| 4,531,431 A | 7/1985 | Dreher et al. | |
| 4,541,378 A | 9/1985 | Kitamura | |
| 4,552,116 A | 11/1985 | Kuroiwa et al. | |
| 4,566,418 A | 1/1986 | Yamamoto et al. | |
| 4,612,615 A | 9/1986 | Murakami | |
| 4,621,525 A | 11/1986 | King et al. | |
| 4,675,585 A | 6/1987 | Krueger et al. | |
| 4,695,819 A | 9/1987 | Bowsher | |
| 4,720,792 A | 1/1988 | Kasai et al. | |
| 4,727,838 A | 3/1988 | Oshiage et al. | |
| 4,763,264 A | 8/1988 | Okuno et al. | |
| 4,785,691 A | 11/1988 | Papenhagen et al. | |
| 4,833,947 A | 5/1989 | Izumi et al. | |
| 4,843,555 A | 6/1989 | Hattori et al. | |
| 4,850,320 A | 7/1989 | Wokan et al. | |
| 4,853,629 A | 8/1989 | Rops | |
| 4,861,115 A | 8/1989 | Petersen | |
| 4,869,220 A | 9/1989 | Imoehl | |
| 4,911,125 A | 3/1990 | Sugawara et al. | |
| 4,915,075 A | 4/1990 | Brown | |
| 4,931,719 A | 6/1990 | Murata et al. | |
| 4,964,051 A | 10/1990 | Sekozawa et al. | |
| 4,966,114 A | 10/1990 | Basten | |
| 4,976,166 A | 12/1990 | Davis et al. | |
| 4,976,239 A | 12/1990 | Hosaka | |
| 4,994,973 A | 2/1991 | Makino et al. | |
| 5,018,595 A | 5/1991 | Hara et al. | |
| 5,025,380 A | 6/1991 | Wataya et al. | |
| 5,047,676 A | 9/1991 | Ichikawa | |
| 5,063,811 A | 11/1991 | Smith et al. | |
| 5,074,267 A | 12/1991 | Ironside et al. | |
| 5,084,658 A | 1/1992 | Nielsen et al. | |
| 5,093,617 A | 3/1992 | Murata | |
| 5,107,388 A | 4/1992 | Murata et al. | |
| 5,109,819 A | 5/1992 | Custer et al. | |
| 5,115,162 A | 5/1992 | Leonard et al. | |
| 5,115,186 A | 5/1992 | Reinartz et al. | |
| 5,133,321 A | 7/1992 | Hering et al. | |
| 5,144,234 A | 9/1992 | Murata | |
| 5,150,681 A | 9/1992 | Kull et al. | |
| 5,161,507 A | 11/1992 | Terazawa et al. | |
| 5,161,633 A | 11/1992 | Torrielli et al. | |
| 5,163,402 A | 11/1992 | Taguchi et al. | |
| 5,167,212 A | 12/1992 | Peter et al. | |
| 5,170,769 A | 12/1992 | Berger et al. | |
| 5,178,112 A | 1/1993 | Terazawa et al. | |
| 5,196,794 A | 3/1993 | Murata | |
| 5,217,280 A | 6/1993 | Nykerk et al. | |
| 5,237,891 A | 8/1993 | Neubauer et al. | |
| 5,241,936 A | 9/1993 | Byler et al. | |
| 5,255,653 A | 10/1993 | Ironside et al. | |
| 5,270,645 A * | 12/1993 | Wheeler et al. | 324/207.12 |
| 5,295,409 A * | 3/1994 | Byram et al. | 74/514 |
| RE34,574 E | 4/1994 | Imoehl | |
| 5,301,646 A | 4/1994 | Doi et al. | |
| 5,302,937 A | 4/1994 | Leue | |
| 5,309,759 A | 5/1994 | Marshall | |
| 5,321,980 A | 6/1994 | Hering et al. | |
| 5,366,424 A | 11/1994 | Wataya | |
| 5,369,360 A | 11/1994 | Amyot | |
| 5,395,293 A | 3/1995 | Matsuura et al. | |
| 5,398,569 A | 3/1995 | Carr | |
| 5,408,899 A | 4/1995 | Stewart | |
| 5,417,193 A | 5/1995 | Fillman et al. | |
| 5,426,995 A | 6/1995 | Maennle | |
| 5,429,092 A | 7/1995 | Kamei | |
| 5,431,141 A | 7/1995 | Kanazawa et al. | |
| 5,431,607 A | 7/1995 | Alder et al. | |
| 5,438,516 A | 8/1995 | Neubauer et al. | |
| 5,445,125 A | 8/1995 | Allen | |
| 5,445,126 A | 8/1995 | Graves, Jr. | |
| 5,447,134 A | 9/1995 | Yokoyama | |
| 5,449,956 A | 9/1995 | Williams | |
| 5,461,289 A | 10/1995 | Adler et al. | |
| 5,463,294 A | 10/1995 | Valdivia et al. | |
| 5,477,116 A | 12/1995 | Journey | |
| 5,514,049 A | 5/1996 | Kamio et al. | |
| 5,517,966 A | 5/1996 | Kanazawa et al. | |
| 5,532,583 A | 7/1996 | Davis et al. | |
| 5,534,672 A | 7/1996 | Meagher | |
| 5,604,433 A | 2/1997 | Theus et al. | |
| 5,664,542 A | 9/1997 | Kanazawa et al. | |
| 5,697,260 A * | 12/1997 | Rixon et al. | 74/514 |
| 5,725,075 A | 3/1998 | Chou | |
| 5,746,005 A | 5/1998 | Steinberg | |
| 5,774,042 A | 6/1998 | Johnston | |
| 5,775,294 A | 7/1998 | Kojima et al. | |
| 5,788,602 A | 8/1998 | Pennese et al. | |
| 5,814,985 A | 9/1998 | Oudet | |
| 5,819,593 A | 10/1998 | Rixon et al. | |
| 5,828,290 A | 10/1998 | Buss et al. | |
| 5,829,317 A | 11/1998 | Vreeken et al. | |
| 5,845,726 A | 12/1998 | Kikkawa et al. | |
| 5,887,488 A | 3/1999 | Riggle | |
| 5,899,830 A | 5/1999 | Tabata | |
| 5,934,152 A | 8/1999 | Aschoff et al. | |
| 5,937,707 A | 8/1999 | Rixon et al. | |
| 5,950,597 A | 9/1999 | Kamio et al. | |
| 5,964,125 A | 10/1999 | Rixon et al. | |
| 5,983,859 A | 11/1999 | Bruedigam et al. | |
| 5,999,875 A | 12/1999 | Bruedigam et al. | |
| 6,003,404 A | 12/1999 | Hannewald | |
| 6,016,457 A | 1/2000 | Toukura et al. | |
| 6,019,016 A | 2/2000 | Takagi et al. | |
| 6,021,757 A | 2/2000 | Nagashima | |
| 6,023,995 A | 2/2000 | Riggle | |
| 6,026,784 A | 2/2000 | Weisman et al. | |
| 6,031,439 A | 2/2000 | Adams et al. | |
| 6,031,448 A | 2/2000 | Starkweather et al. | |
| 6,032,640 A | 3/2000 | Evans | |
| 6,047,679 A | 4/2000 | Matsumoto et al. | |
| 6,087,827 A | 7/2000 | Oudet | |
| 6,089,120 A * | 7/2000 | Lochle et al. | 74/514 |
| 6,098,971 A | 8/2000 | Stege et al. | |
| 6,105,737 A | 8/2000 | Weigert et al. | |
| 6,111,401 A | 8/2000 | Mierzwinski | |
| 6,133,729 A | 10/2000 | Mierzwinski | |
| 6,134,499 A | 10/2000 | Goode et al. | |
| 6,135,575 A | 10/2000 | Feigel et al. | |
| 6,137,288 A * | 10/2000 | Luetzow | 324/207.2 |
| 6,188,945 B1 | 2/2001 | Graf et al. | |
| 6,192,860 B1 | 2/2001 | Hatlen | |
| 6,193,333 B1 | 2/2001 | Guest | |
| 6,202,021 B1 | 3/2001 | Kresse et al. | |
| 6,209,518 B1 | 4/2001 | Machida et al. | |
| 6,220,222 B1 | 4/2001 | Kalsi | |
| 6,252,389 B1 | 6/2001 | Baba et al. | |
| 6,252,394 B1 * | 6/2001 | Roze et al. | 324/207.12 |
| 6,263,859 B1 | 7/2001 | Kalsi | |
| 6,272,416 B1 | 8/2001 | Kuroda et al. | |
| 6,275,024 B1 | 8/2001 | Uneme et al. | |
| 6,276,331 B1 | 8/2001 | Machida et al. | |
| 6,278,915 B1 | 8/2001 | Deguchi et al. | |
| 6,279,551 B1 | 8/2001 | Iwano et al. | |
| 6,282,465 B1 | 8/2001 | Nishijima et al. | |
| 6,283,150 B2 | 9/2001 | Apel et al. | |
| 6,296,327 B1 | 10/2001 | Linkenbach | |
| 6,302,823 B1 | 10/2001 | Eckert et al. | |
| 6,321,722 B1 | 11/2001 | Nakano | |
| 6,323,643 B1 | 11/2001 | Kordecki | |
| 6,330,504 B1 | 12/2001 | Toukura et al. | |
| 6,330,838 B1 * | 12/2001 | Kalsi | 74/514 |
| 6,332,374 B1 | 12/2001 | Someda et al. | |
| 6,342,829 B1 | 1/2002 | Takagi et al. | |
| 6,352,007 B1 | 3/2002 | Zhang et al. | |
| 6,360,631 B1 | 3/2002 | Wortmann et al. | |

| | | |
|---|---|---|
| 6,371,885 B1 | 4/2002 | Kobayashi et al. |
| 6,371,888 B1 | 4/2002 | Watanabe |
| 6,373,148 B1 | 4/2002 | Daiss et al. |
| 6,379,279 B1 | 4/2002 | Miyamoto |
| 6,379,280 B1 | 4/2002 | Ogawa et al. |
| 6,379,284 B1 | 4/2002 | Hanai et al. |
| 6,396,259 B1 | 5/2002 | Washeleski et al. |
| 6,397,686 B1 | 6/2002 | Taivalkoski et al. |
| 6,400,141 B1 | 6/2002 | Apel et al. |
| 6,407,526 B1 | 6/2002 | Black, III et al. |
| 6,412,364 B1 | 7/2002 | Berglar |
| 6,417,634 B1 | 7/2002 | Bergström |
| 6,422,125 B1 | 7/2002 | Fulks |
| 6,425,366 B1 | 7/2002 | Ogawa et al. |
| 6,426,619 B1 | 7/2002 | Pfaffenberger et al. |
| 6,442,454 B1 | 8/2002 | Akiba et al. |
| 6,442,472 B1 | 8/2002 | Vivek et al. |
| 6,445,083 B2 | 9/2002 | Göhring |
| 6,446,500 B1 | 9/2002 | Marquardt et al. |
| 6,450,145 B2 | 9/2002 | Machida et al. |
| 6,454,677 B2 | 9/2002 | Saito et al. |
| 6,460,429 B1* | 10/2002 | Staker ............... 74/513 |
| 6,471,304 B1 | 10/2002 | Deml et al. |
| 6,474,191 B1 | 11/2002 | Campbell |
| 6,481,413 B2 | 11/2002 | Chang |
| 6,486,774 B1 | 11/2002 | Arnold, Sr. |
| 6,488,005 B2 | 12/2002 | Kim |
| 6,492,697 B1 | 12/2002 | Plagens et al. |
| 6,493,618 B2 | 12/2002 | Nada |
| 6,505,496 B2 | 1/2003 | Kato et al. |
| 6,515,473 B2 | 2/2003 | Pfaffenberger et al. |
| 6,526,827 B2 | 3/2003 | Ueyanagi et al. |
| 6,554,667 B1 | 4/2003 | Dodson |
| 6,565,482 B2 | 5/2003 | Kobayashi et al. |
| 6,571,660 B2 | 6/2003 | Gmurowski et al. |
| 6,577,119 B1 | 6/2003 | Yaddehige |
| 6,580,239 B1 | 6/2003 | Tamaki et al. |
| 6,581,491 B2 | 6/2003 | Brock et al. |
| 6,591,821 B1 | 7/2003 | Kong |
| 6,595,898 B2 | 7/2003 | Kobayashi et al. |
| 6,598,693 B2 | 7/2003 | Honda et al. |
| 6,626,144 B1 | 9/2003 | Kanamaru |
| 6,647,959 B2 | 11/2003 | Noguchi |
| 6,654,677 B2 | 11/2003 | Weber et al. |
| 6,655,199 B1 | 12/2003 | Smith |
| 6,666,106 B1 | 12/2003 | Hueges et al. |
| 6,668,774 B1 | 12/2003 | Dauer et al. |
| 2002/0036495 A1 | 3/2002 | Hannewald et al. |
| 2002/0100341 A1 | 8/2002 | Kumamoto et al. |
| 2002/0174738 A1* | 11/2002 | Menzies ............... 74/513 |
| 2002/0175676 A1 | 11/2002 | Pfaffenberger et al. |
| 2003/0107368 A1 | 6/2003 | Sekiya |
| 2003/0121356 A1 | 7/2003 | Rixon et al. |
| 2003/0154817 A1 | 8/2003 | Staker |
| 2005/0034292 A1* | 2/2005 | Staker ............... 29/595 |
| 2005/0039564 A1* | 2/2005 | Ouyang et al. ............... 74/514 |
| 2005/0247158 A1* | 11/2005 | Willemsen et al. ............... 74/513 |
| 2006/0117902 A1* | 6/2006 | Martin et al. ............... 74/512 |
| 2006/0169097 A1* | 8/2006 | Peniston et al. ............... 74/564 |
| 2006/0179971 A1* | 8/2006 | Peniston et al. ............... 74/560 |
| 2006/0179972 A1* | 8/2006 | Peniston et al. ............... 74/560 |
| 2006/0185468 A1* | 8/2006 | Richardson et al. ............... 74/560 |
| 2008/0276749 A1* | 11/2008 | Stewart et al. ............... 74/512 |

FOREIGN PATENT DOCUMENTS

| | | |
|---|---|---|
| EP | 1271275 A1 | 1/2003 |
| GB | 2403294 A | 12/2004 |
| WO | 03095938 A1 | 11/2003 |

* cited by examiner

FIG. 20B
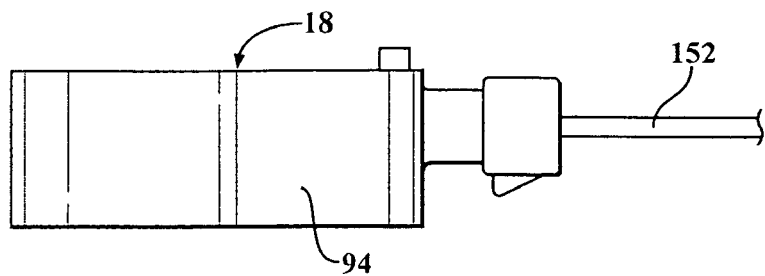
FIG. 20C
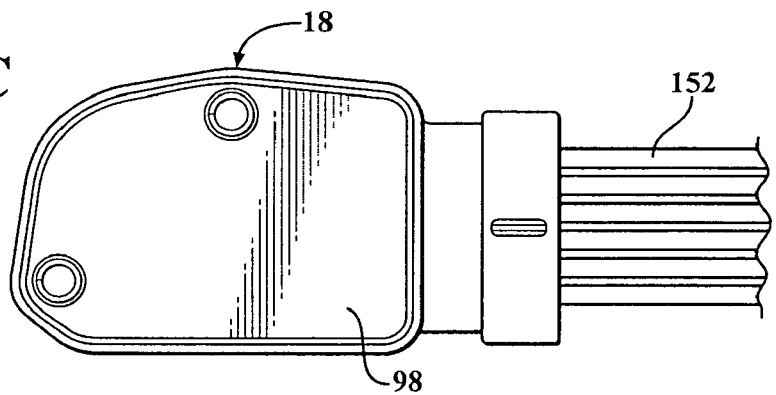
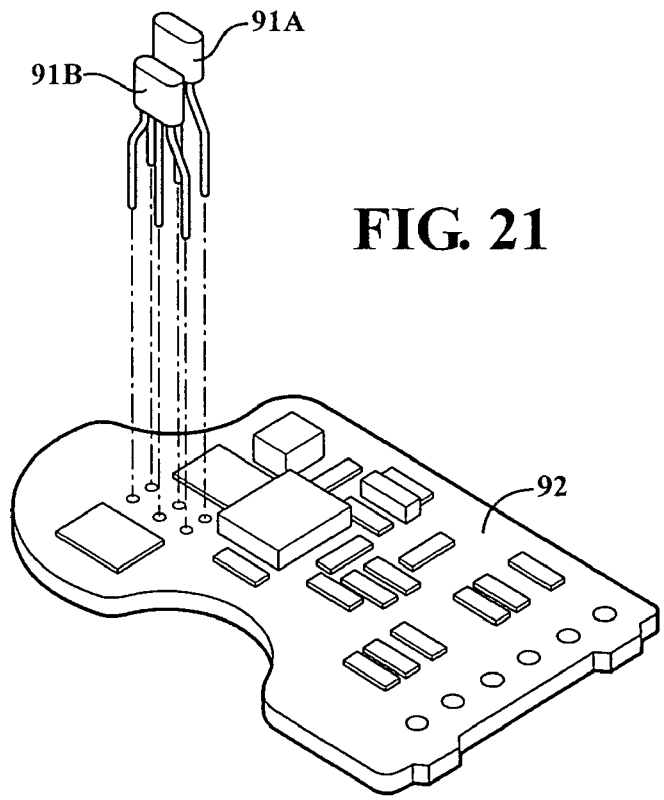
FIG. 21

PEDAL SENSOR AND METHOD

CROSS-REFERENCE TO RELATED APPLICATIONS

This application claims priority to provisional U.S. patent application entitled, "MODULAR PEDAL ASSEMBLY HAVING AN ELECTRONIC CONTROLLER," filed Jan. 18, 2005, having a Ser. No. 60/644,884 and now pending, the disclosure of which is hereby incorporated by reference in its entirety. This application also claims priority to provisional U.S. patent application entitled, "MODULAR PEDAL ASSEMBLY HAVING AN ELECTRONIC CONTROLLER," filed Jun. 24, 2005, having a Ser. No. 60/693,845 and now pending, the disclosure of which is also hereby incorporated by reference in its entirety. This application further claims priority to provisional U.S. patent application entitled, "ELECTRONIC CONTROLLER," filed Jun. 2, 2005, having a Ser. No. 60/686,642 and now pending, the disclosure of which is also hereby incorporated by reference in its entirety.

FIELD OF THE INVENTION

The present invention relates generally to dynamic systems such as, for example, pedal assemblies. More particularly, the present invention relates to electronic pedal assemblies and methods of operation thereof.

BACKGROUND OF THE INVENTION

Automobiles, motorcycles, boats and other types of vehicles typically include one or more pedals that control the speed at which the vehicles travel and accelerate. For example, some vehicles include an accelerator pedal, a brake pedal and a pedal that controls the clutch. Typically, each of these pedals is a complex mechanical system that includes a plurality of interconnected levers.

Many mechanical systems have a variety of shortcomings. For example, components in a mechanical system that are mechanically connected and moveable relative to each other are subject to friction. As such, these components wear out over time. Also, fasteners connecting two or more components in a mechanical system often loosen over time, typically as a result of being subjected to extended periods of vibrations in the system. As such, the components of mechanical systems start to move relative to each other in unintended directions (i.e., more and more "play" is introduced into the system).

In order to overcome some of the above-discussed shortcomings of mechanical systems and, more particularly, the shortcomings of mechanical pedals, electronic pedals have been developed. However, many currently-available electronic pedals suffer from a variety of shortcomings as well. For example, some operators of the vehicles in which mechanical pedals have been replaced by electronic pedals frequently complain that the electronic pedals do not provide the same kind of operator feedback as mechanical pedals. In other words, electronic pedals do not have the same "feel" as the mechanical pedals to which the operators have been accustomed to all of their lives. Also, some electronic pedals are subject to failing catastrophically and without warning if a single one of the electronic components included therein fails.

In addition to the above, both mechanical and electronic pedals typically include a relatively large number of components (e.g., bolts, screws, rivets). Therefore, a substantial amount of time and effort is typically needed to assemble either a mechanical or electronic pedal.

At least in view of the above, it would be desirable to have provide electronic pedals that overcome the shortcomings of mechanical pedals while retaining the "feel" of mechanical pedals. It would also be desirable to provide electronic pedals that are relatively easy to assemble and that maintain the safety of a vehicular operator even if the pedal fails. Further, it would also be desirable to provide methods for operating and manufacturing such pedals.

SUMMARY OF THE INVENTION

The foregoing needs are met, to a great extent, by various embodiments of the present invention. According to a first embodiment of the present invention, a dynamic system is provided. The dynamic system includes a moveable component that is rotatably mounted to a mounting bracket for movement between various positions. A rotor assembly is connected to the moveable component for concurrent movement with the moveable component between the positions. The dynamic system also includes an emitter fixedly connected to the rotor assembly. A casing defines an inner cavity and is mountable to the mounting bracket about the rotor assembly. The casing also defines a working chamber outside of the inner cavity with a portion of the rotor assembly and the emitter being disposed within the working chamber when the casing is mounted to the mounting bracket. A sensor is disposed within the inner cavity of the casing and is positioned adjacent the rotor assembly when the casing is mounted to the mounting bracket for detecting a position of the emitter.

There has thus been outlined, rather broadly, certain embodiments of the invention in order that the detailed description thereof herein may be better understood, and in order that the present contribution to the art may be better appreciated. There are, of course, additional embodiments of the invention, such as those that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 20B is a side planar view of the electronic controller with a wiring harness mounted thereto.

FIG. 20C is a back planar view of the electronic controller with a wiring harness mounted thereto.

FIG. 21 is a perspective view of a circuit board and a pair of hall effect sensors.

DETAILED DESCRIPTION

Figure 1:
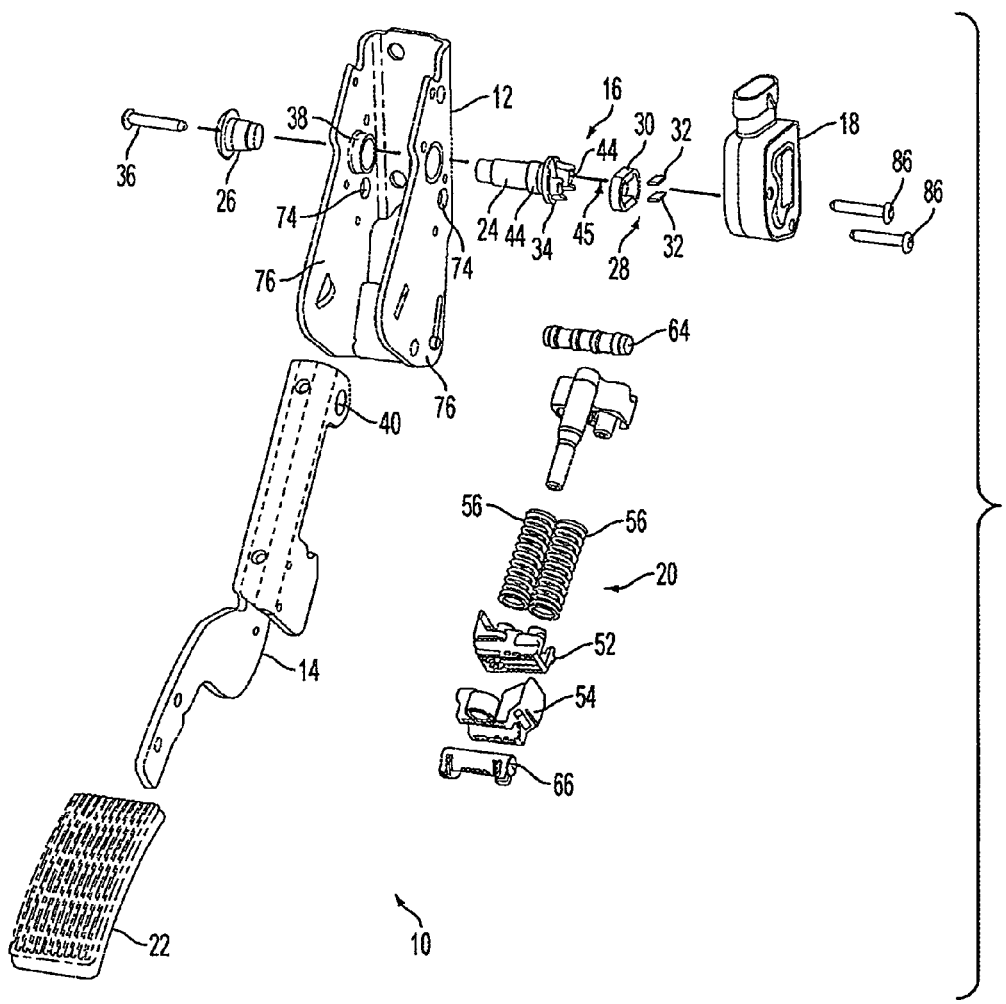
FIG. 1 is an exploded view of a pedal assembly according to an embodiment of the invention.

Embodiments in accordance with the present invention will now be described with reference to the drawing figures, in which like reference numerals refer to like parts throughout. FIG. 1 is an exploded view of a pedal assembly 10 according to an embodiment of the invention. The pedal assembly 10 generally includes a mounting bracket 12, a pedal arm 14, a rotor assembly 16, a sensor assembly 18, a hysteresis assembly 20, and a treadle 22, or foot pedal 22, attached to one end of pedal arm 14. Pedal arm 14 may be unitary or multi-piece, and converts translation of treadle 22 into rotation of rotor assembly 16, which rotation is in turn sensed by sensor assembly 18. Hysteresis assembly 20 provides friction and a return force to pedal assembly 10. The components and operation of sensor assembly 18 and hysteresis assembly 20 are described in further detail below.

Rotor assembly 16 includes a shaft 24, an end cap 26, and magnetic assembly 28. Magnetic assembly 28, in turn, includes a shield 30 and magnets 32. A mounting cap 34, to which magnetic assembly 28 is attached, is provided on at least one end of shaft 24 adjacent sensor assembly 18. In certain embodiments, mounting caps 34 and magnetic assemblies 28 are provided at both ends of shaft 24 adjacent corresponding sensor assemblies 18. Shaft 24 and end cap 26 are secured together, for example by an appropriate fastener 36, such as a bolt, a screw, or a pin.

Shaft 24 connects pedal arm 14 and mounting bracket 12. Shaft 24 is self-lubricating, such as a Teflon®.-coated shaft or a composite Delrin®. (Delrin®. 500CL) shaft. The use of a self-lubricating shaft 24 substantially eliminates the need for discrete bearings supporting pedal arm 14. That is, shaft 24 functions in place of a bearing, permitting simpler assembly of pedal assembly 10 and, in some embodiments, up to approximately fifteen million actuation cycles of pedal assembly 10 without failure.

Mounting bracket 12 includes integrally-formed, inwardly-protruding bearing surfaces 38 to support pivot shaft 24 and pedal arm 14. Mounting bracket 12 is a single component formed from a rigid material, for example steel, by an appropriate machining process, for example stamping. Bearing surfaces 38 are deep drawn into mounting bracket 12. First, small holes are created on mounting bracket 12 at the desired locations of bearing surfaces 38. Mounting bracket 12 is then drawn at these holes to the required depth and diameter for bearing surfaces 38 via a series of successive punches or a cone-shaped forming die.

Mounting bracket 12, pedal arm 14, and rotor assembly 16 are assembled by aligning apertures 40 in pedal arm 14 with bearing surfaces 38 on mounting bracket 12. Shaft 24 is then inserted so as to pivotally connect pedal arm 14 and mounting bracket 12. The interior profile of apertures 40 complements the exterior profile of shaft 24, thereby ensuring a proper, secure fit between these components and conversion of translation of treadle 22 into rotation of rotor assembly 16. That is, pedal arm 14 does not rotate freely about shaft 24; rather, pedal arm 14 and shaft 24 rotate together upon bearing surfaces 38. Once shaft 24 is positioned, end cap 26 is secured thereto in order to hold shaft 24 in place.

As described above, magnetic assembly 28 (shield 30 and magnets 32) is attached to shaft 24 at one end thereof on mounting cap 34. Mounting cap 34 is attached to shaft 24 so as to rotate with shaft 24 when treadle 22 is depressed or released. In certain embodiments of the present invention, mounting cap 34 is integrally formed with shaft 24, though it is regarded as within the scope of the present invention to fixedly attach a separate mounting cap 34 to shaft 24.

Figure 2:
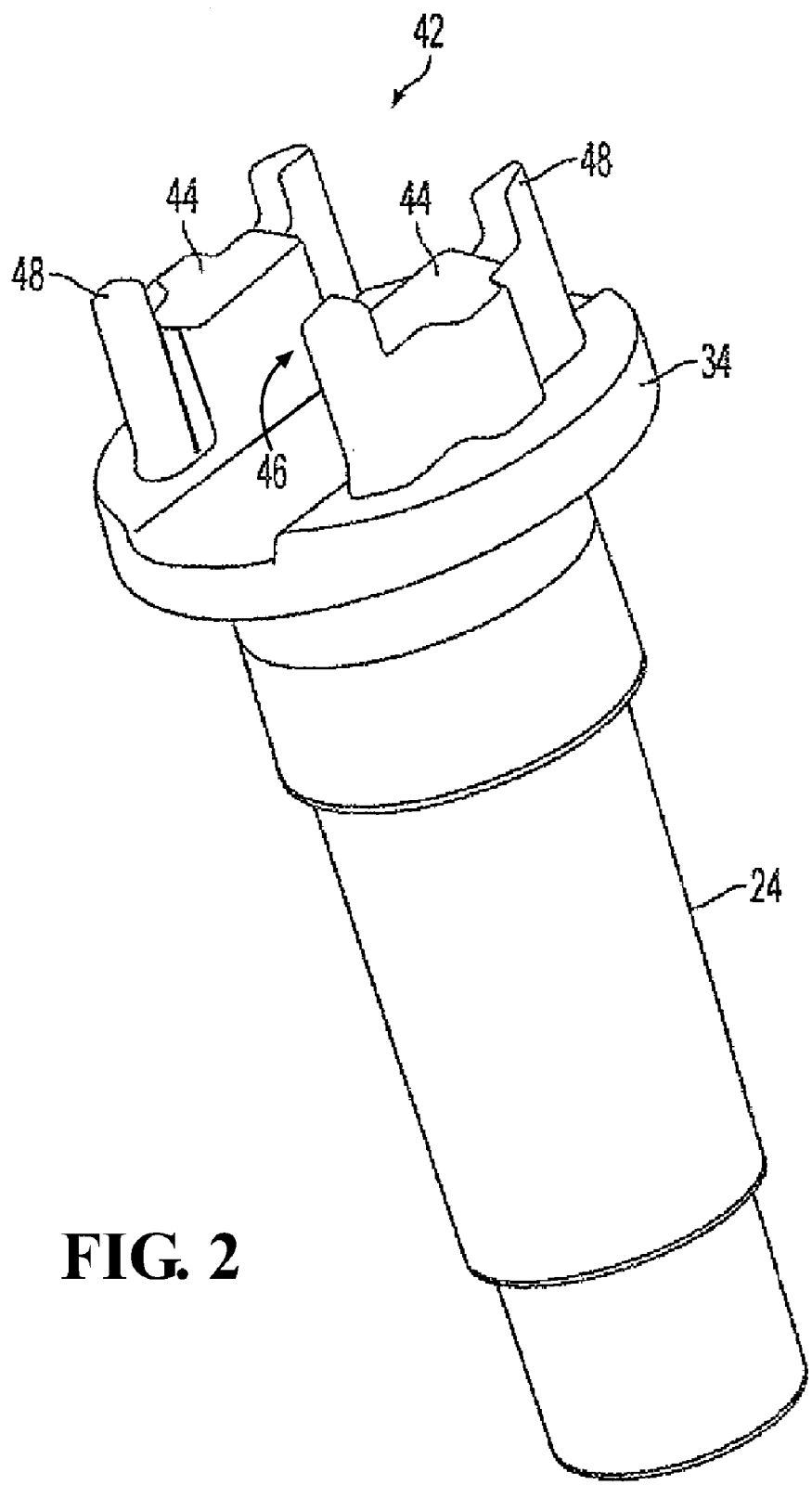
FIG. 2 is a perspective view of a pivot shaft and mounting cap according to an embodiment of the invention.

FIG. 2 is a perspective view of a pivot shaft 24 and mounting cap 34 according to an embodiment of the invention. As shown in FIG. 2, mounting means 42 for magnetic assembly 28 are integrally formed on mounting cap 34, for example by molding mounting means 42 thereon. Mounting means 42 generally include shield locating features, such as towers 44, magnet locating features, such as slots 46, and retention features, such as pins 48. In certain embodiments of the present invention, a pair of shield locating towers 44 project from mounting cap 34, and shield 30 fits around towers 44, as shown in FIG. 1. That is, the exterior profile of towers 44 corresponds to the interior profile of shield 30. Similarly, a pair of magnet locating slots is provided into which magnets 32 are fit.

Once installed with reference to locating features 44, 46, shield 30 and magnets 32 are secured on mounting cap 32 and define an interior portion of the rotor 16. In certain embodiments of the present invention, shield 30 and magnets 32 are secured via rivets driven into the retention features. In other embodiments, pins 48 are heat-staked to secure shield 30 and magnets 32. In still other embodiments, shield 30 and magnets 32 are secured through an overmolding process applied to mounting means 42. In substantially all embodiments, however, the end result is a simplified unitary mounting for the rotating magnetic assembly 28. Thus, as treadle 22 is depressed or released, pedal arm 14 will convert this translation into rotation of shaft 24, mounting cap 34, and magnetic assembly 28, which rotation is detected by sensor assembly 18 as further described below.

Figure 3:
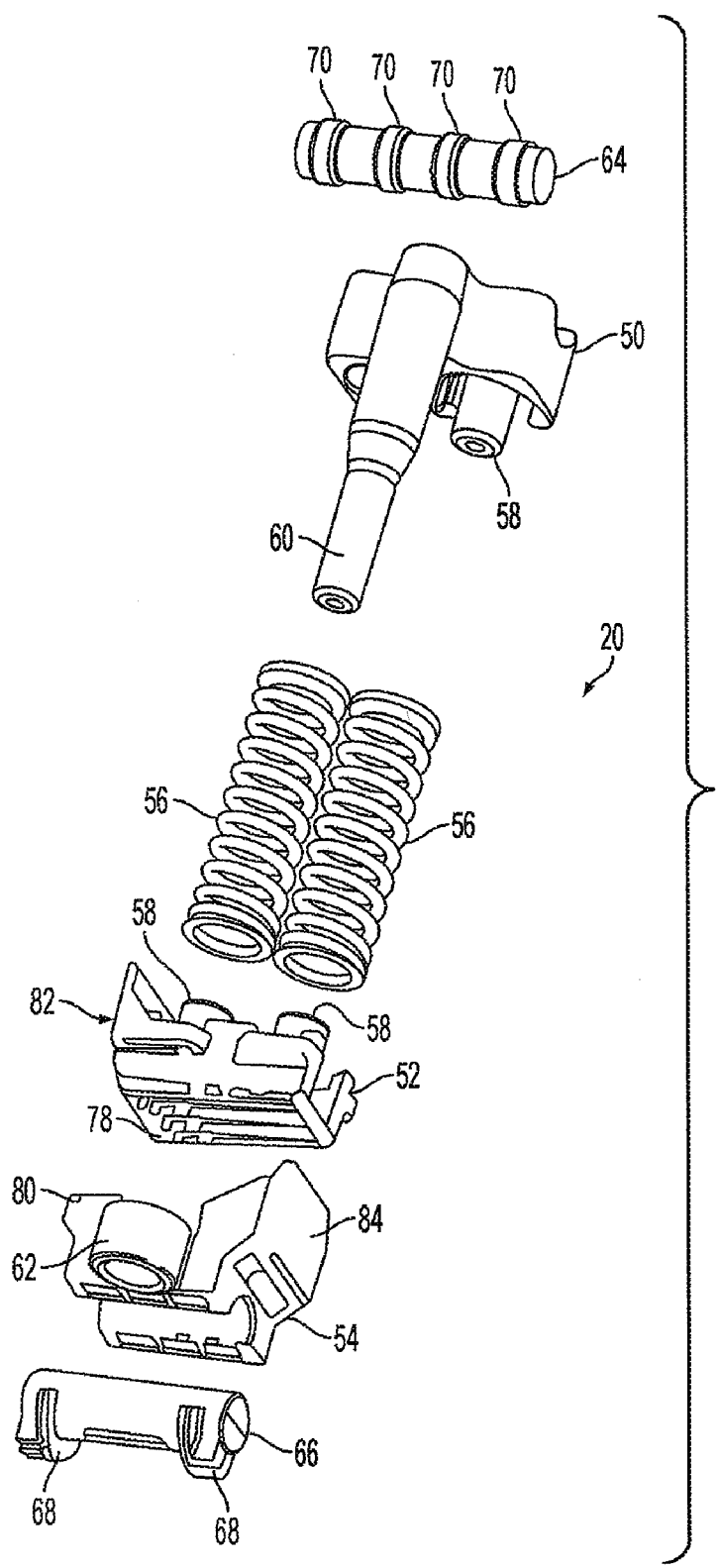
FIG. 3 is an exploded view of the hysteresis assembly illustrated in FIG. 1

Referring now to FIGS. 1 and 3, hysteresis assembly 20 provides hysteresis forces, including frictional forces and return forces, to pedal assembly 10. Specifically, hysteresis assembly 20 provides a baseline force, herein referred to as an "initial displacement force" necessary to displace pedal arm 14 from its initial (i.e., idle) position. Hysteresis assembly 20 also provides frictional forces designed to give a user the impression of a mechanical pedal assembly 10, and a return force intended both to give the impression of a mechanical pedal and to bias pedal arm 14 towards its initial position. Thus, if the user releases treadle 22, pedal arm 14 will return to its initial, idle position, and will not stick in an open position.

Figure 4:
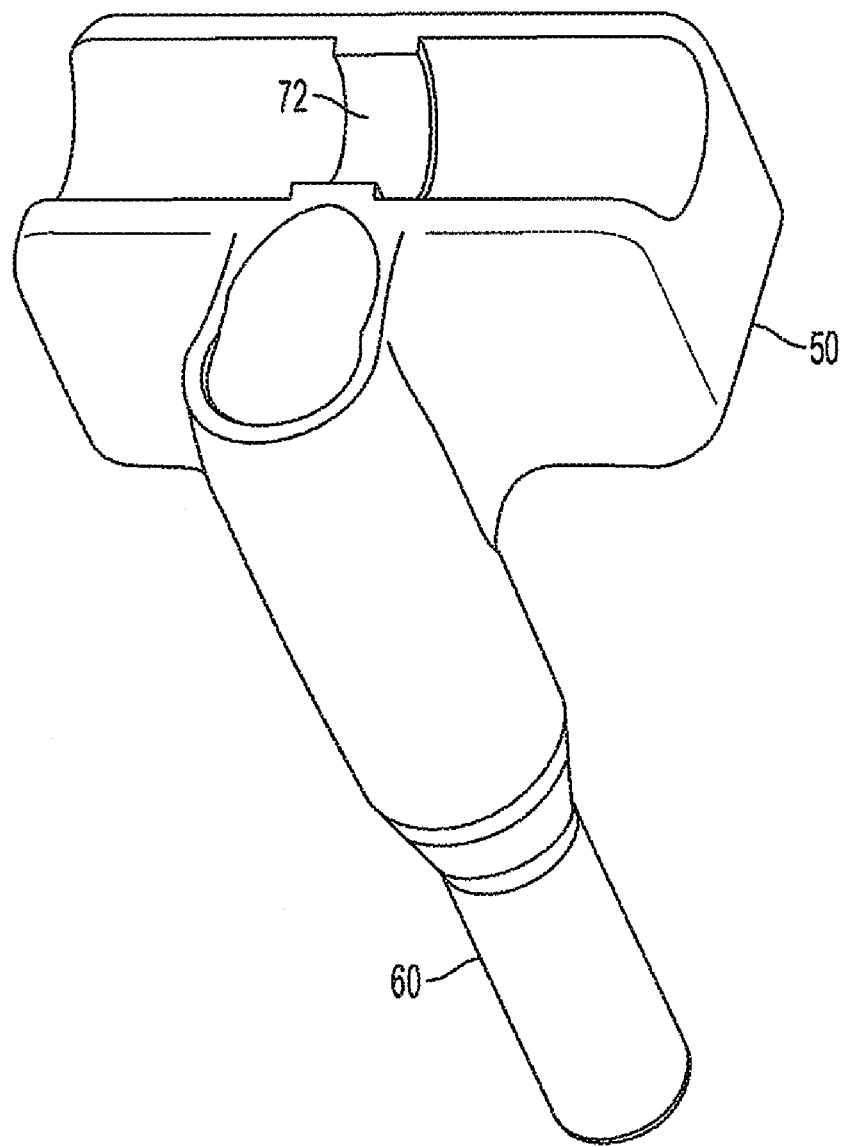
FIG. 4 illustrates the shaft and elastic member support illustrated in FIG. 3.

FIG. 3 is an exploded view of the hysteresis assembly 20 illustrated in FIG. 1. Hysteresis assembly 20 generally includes an elastic member support 50, a first hysteresis block 52, a second hysteresis block 54, and an elastic member, for example springs 56, though other elastic members are regarded as within the scope of the invention. Springs 56 connect elastic member support 50 and first hysteresis block 52 via seats 58 thereon. An alignment pin 60, which, in certain embodiments of the present invention, is integrally formed with elastic member support 50, aligns elastic member support 50 and second hysteresis block 54. That is, alignment pin 60 maintains the relative orientation of elastic member support 50 and hysteresis blocks 52, 54, as well as springs 56, such as by slidably engaging a collar 62 on second hysteresis block 54. Hysteresis assembly 20 also includes a shaft 64 to connect hysteresis assembly 20 to mounting bracket 12, and a pin 66 to attach hysteresis assembly 20 to pedal arm 14, both shown in FIG. 1. In some embodiments in accordance with the invention, pin 66 includes ears 68. When hysteresis assembly 20 is installed in pedal assembly 10, ears 68 are positioned between mounting bracket 12 and pedal arm 14 to prevent lateral movement of pedal arm 14 within mounting bracket 12. Similarly, shaft 60 may include rings 70 to retain shaft 60 within mounting bracket 12 and to prevent sliding between shaft 60 and elastic member support 50, which has a corresponding ridge 72 thereon, as illustrated in FIG. 4, which illustrates the shaft 60 and elastic member support 50 illustrated in FIG. 3.

Returning to FIG. 1, shaft 64 pivotally attaches hysteresis assembly 20 to mounting bracket 12 at mounting holes 74, with outermost rings 70 abutting the interior face of mounting bracket 12. As one of skill in the art will appreciate from this disclosure, hysteresis assembly 20 is installed underneath pedal arm 14, between sidewalls 76 of mounting bracket 12, such that displacement of pedal arm 14 also causes displacement of hysteresis assembly 20, with hysteresis blocks 52, 54 disposed between sidewalls 76. However, while pedal arm 14 pivots about shaft 24, hysteresis assembly 20 pivots about shaft 64. Therefore, as pedal arm 14 pivots, the distance between pin 66 and shaft 24 changes, displacing springs 56.

Springs 56 are biased to return pedal arm 14 to its initial, idle position. As pedal arm 14 is displaced, via pressure applied to treadle 22, springs 56 are stretched from equilibrium, generating a return force $F_r$. The return force will tend to restore springs 56 to their original length, which, in turn, will tend to urge pedal arm 14 back to its initial, idle position. For linear springs 56, $F_r$ is a function of the displacement from equilibrium (x) given by the equation $F_r=kx$, where k is the spring rate. It is thus possible to customize the return force profile of hysteresis assembly 20, given a particular geometry of pedal assembly 10, by selecting springs to have a spring rate k corresponding to the desired return force profile.

As with the selection of springs 56, the location of mounting holes 74 on mounting bracket 12 is determined through an analysis of desired hysteresis characteristics. First, a desired initial displacement force is selected. (As specified above, the "initial displacement force" is that force necessary to displace pedal arm 14 from its initial, idle position. This force may also be referred to as the "idle force.") As with the return force $F_r$, the initial displacement force is related to the spring rate k. Thus, if hysteresis assembly 20 is installed into pedal assembly 10 with springs 56 near equilibrium, only a very small force will be required to initially displace pedal arm 14 from idle. On the other hand, if hysteresis assembly 20 is installed into pedal assembly 10 with springs 56 displaced from equilibrium, a proportionally larger force will be necessary to initially displace pedal arm 14. It should be recognized that changing the position of mounting holes 74 will change the initial idle position length of springs 56, and therefore the idle force. Depending upon the spring rate k of springs 56, it is possible to vary the initial displacement force by approximately 25% by moving mounting holes 74 approximately 2 mm. Once the desired initial displacement force has been identified, the corresponding location of mounting holes 74 may be calculated.

Figure 5:
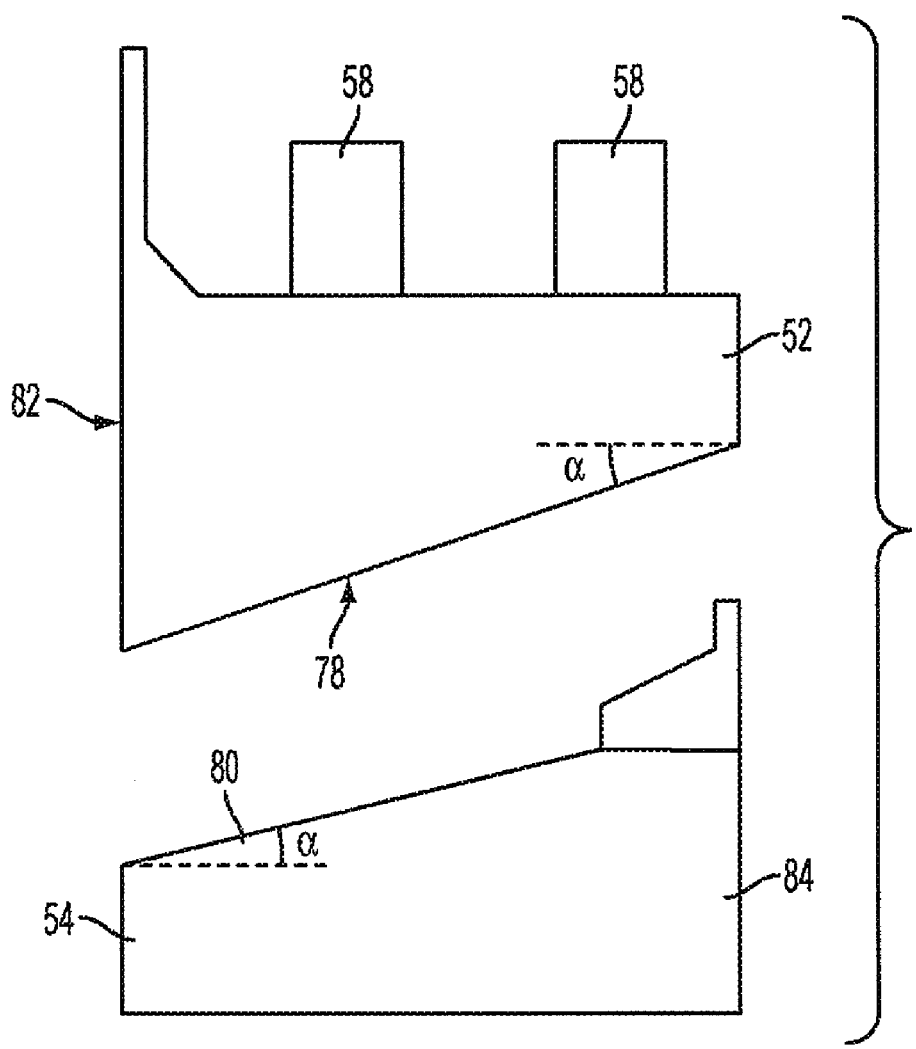
FIG. 5 illustrates an exploded view of the hysteresis blocks illustrated in FIG. 3.
Figure 6:
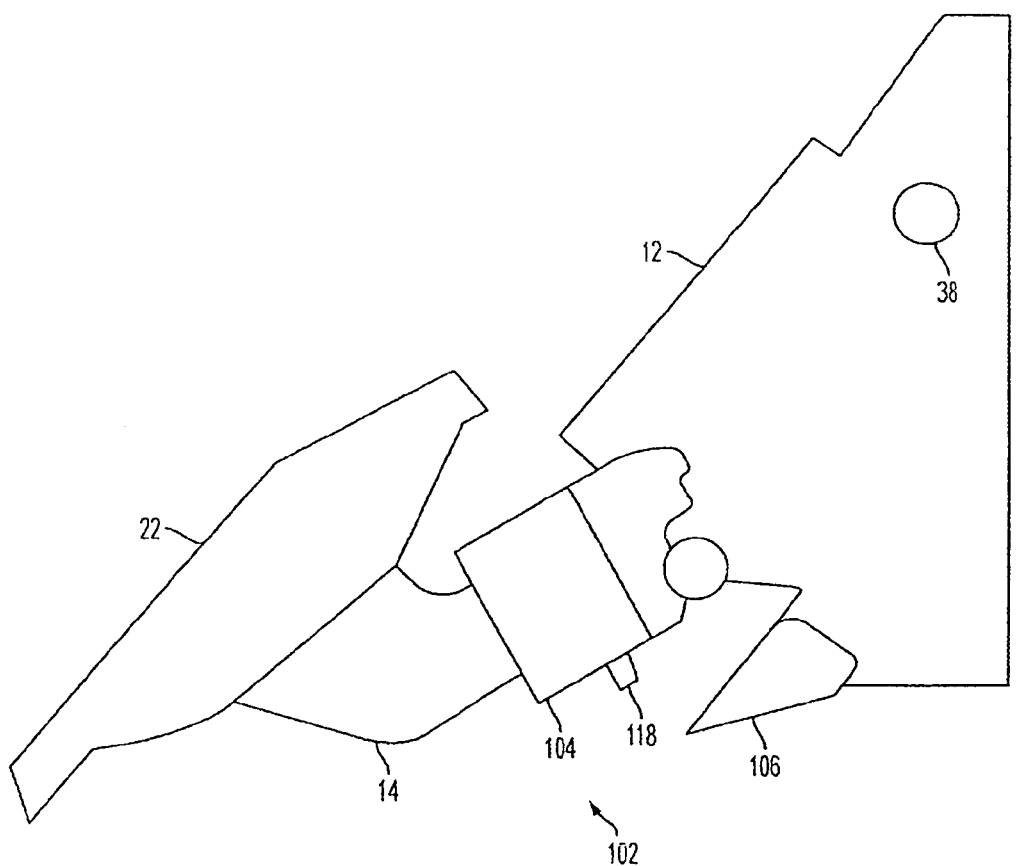
FIG. 6 is a side view of a pedal assembly according to another embodiment of the present invention wherein a kickdown mechanism is included.
Figure 7:
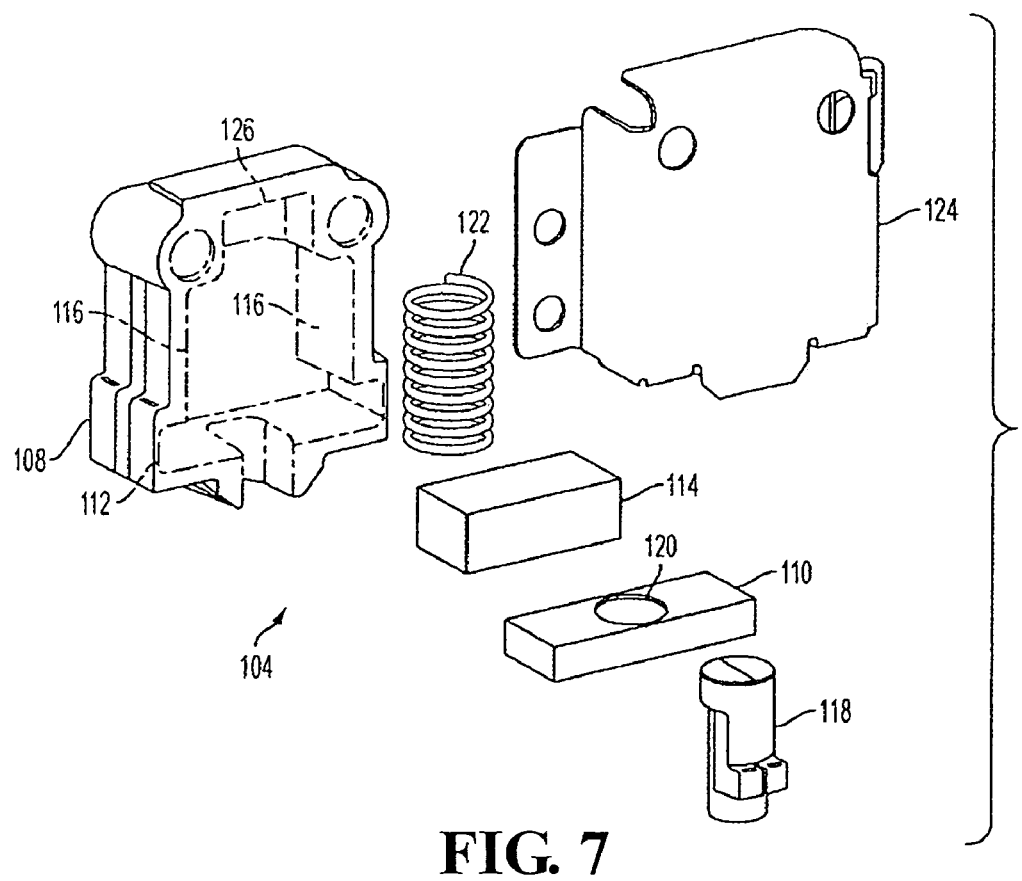
FIG. 7 is an exploded view of the kickdown mechanism illustrated in FIG. 6.

As shown in FIGS. 1, 3, and 5, a first surface 78 on first hysteresis block 52 and a second surface 80 on second hysteresis block 54 interface at a slope a. When pedal arm 14 is displaced, a component of the reaction force to springs 56 acts to slide hysteresis blocks 52, 54 relative to each other along the sloped interface. In turn, this relative sliding motion causes at least one of frictional surfaces 82, 84 to frictionally engage the interior surface of sidewalls 76 on mounting bracket 12. Additional pressure on treadle 22 forces hysteresis blocks 52, 54 further apart, increasing the normal force between frictional surfaces 82, 84 and sidewalls 76, and thus the frictional force acting to inhibit further depression of pedal arm 14. The angle of the slope a between first and second surfaces 78, 80 is calculated to provide a desired frictional force profile as pedal arm 14 is displaced from its initial, idle position. Likewise, the coefficient of friction between hysteresis blocks 52, 54 along first and second surfaces 78, 80 and the coefficient of friction between frictional surfaces 82, 84 and sidewalls 76 may be adjusted to achieve the desired frictional force profile. Further, it is possible to configure hysteresis blocks 52, 54 to supply a component of the initial displacement force simply by having frictional surfaces 82, 84 in frictional engagement with sidewalls 76 when pedal arm 14 is in its initial, idle position.

As should be clear from the foregoing, the frictional forces between hysteresis blocks 52, 54 and sidewalls 76 are directly related to the forces generated by springs 56. That is, increased spring forces cause increased frictional forces and vice versa. This ensures that pedal assembly 10 complies with industry standards requiring return-to-idle when treadle 22 is released. Further, in the unlikely event a spring 56 fails, the return force $F_r$ would be halved, but so too would the frictional forces. Where frictional forces are independent of spring forces, it is possible for pedal arm 14 to "stick" in an open position when there is such a failure, as the return force may be insufficient to overcome the frictional force where the two are unrelated.

A pedal assembly 10 with customized hysteresis forces can be constructed using the principles elucidated above. For example, it is possible to alter the idle and Wide Open Throttle (WOT) pedal forces while maintaining the same relative relationship between the two. Alternatively, either force may be kept constant, and the difference between the two varied. First, the end user identifies the desired initial displacement force, the desired return force profile, and the desired frictional fore profile. Analyses are then conducted to determine the spring rate k of an elastic member 56 corresponding to the desired return force profile, the slope a of the interface between hysteresis blocks 52, 54 corresponding to the desired frictional force profile, and the location of mounting holes 74 corresponding to the desired initial displacement force. If desired, the frictional force profile may also be adjusted by selecting appropriate coefficients of friction as described above. Hysteresis assembly 20 is then constructed using an elastic member 56 with spring rate k and a pair of adjacent hysteresis blocks 52, 54 interfacing at the calculated slope a. Appropriately located mounting holes 74 are made on mounting bracket 12, and an end of hysteresis assembly 20 is attached via shaft 64.

As will be appreciated by one of skill in the art, FIG. 1 illustrates a dynamic system in the form of pedal assembly 10. However, other dynamic systems are also within the scope of the present invention. For example, systems wherein it is desired to monitor the position of a moveable component and/or wherein it is desired to provide a hysteresis force to the moveable component are also within the scope of the present invention.

The pedal assembly 10 illustrated in FIG. 1 includes a moveable component in the form of treadle 22. As previously discussed and illustrated in FIG. 1, treadle 22 is connected to pedal mounting bracket 12 via pedal arm 14.

Also illustrated in FIG. 1 is end cap 26 that is connected to a rotor shaft 24 using fastener 36 in order to form rotor assembly 16. As further illustrated in FIG. 1 and previously discussed above, rotor assembly 16 is connected to treadle 22 via pedal arm 14 and rotor assembly 16 is configured to rotate when treadle 22 moves between a first position (e.g., an idle position) and a second position (e.g., an open throttle position).

FIG. 1 also illustrates a pair of magnets 32 that each have an associated emitted magnetic field that, although not illustrated in FIG. 1, emanates from each magnet 32 and grows gradually weaker at greater distances away from each magnet 32. Each magnet 32, according to certain embodiments of the present invention, is fixedly connected to rotor assembly 16 via the slots 46 and pins 48 illustrated in FIG. 2 that protrude from a proximate end of shaft 24.

Positioned adjacent to rotor assembly 16, also on the proximate end thereof, is sensor assembly 18. Sensor assembly 18, as illustrated in FIG. 1, is attached to mounting bracket 12 via the use of the two fasteners 86 illustrated on the right-hand side of FIG. 1. As will be discussed below, sensor assembly 18 is configured to detect the position of one or both of the magnets 32 as they rotate about the longitudinal axis of rotor shaft 24 when treadle 22 is depressed by a user of the pedal assembly 10. Typically, sensor assembly 18 detects the position of the magnets 32 using a Hall sensor, as will also be described below.

As mentioned above, FIG. 1 also illustrates a magnetic shield 30 that is positioned adjacent to the towers 44 protruding from mounting cap 34 on rotor shaft 24 of rotor assembly 16. When all of the components of rotor assembly 16 illustrated in FIG. 1 are connected to each other, magnetic shield 30 substantially surrounds a portion of rotor assembly 16 that is adjacent to each of the magnets 32. As will be discussed below, magnetic shield 30 not only prevents exterior magnetic fluxes from interacting with either of the magnets 32, but also acts as a flux concentrator that concentrates the magnetic fluxes from each of the magnets 32 within the interior of the magnetic shield 30.

Figure 18:
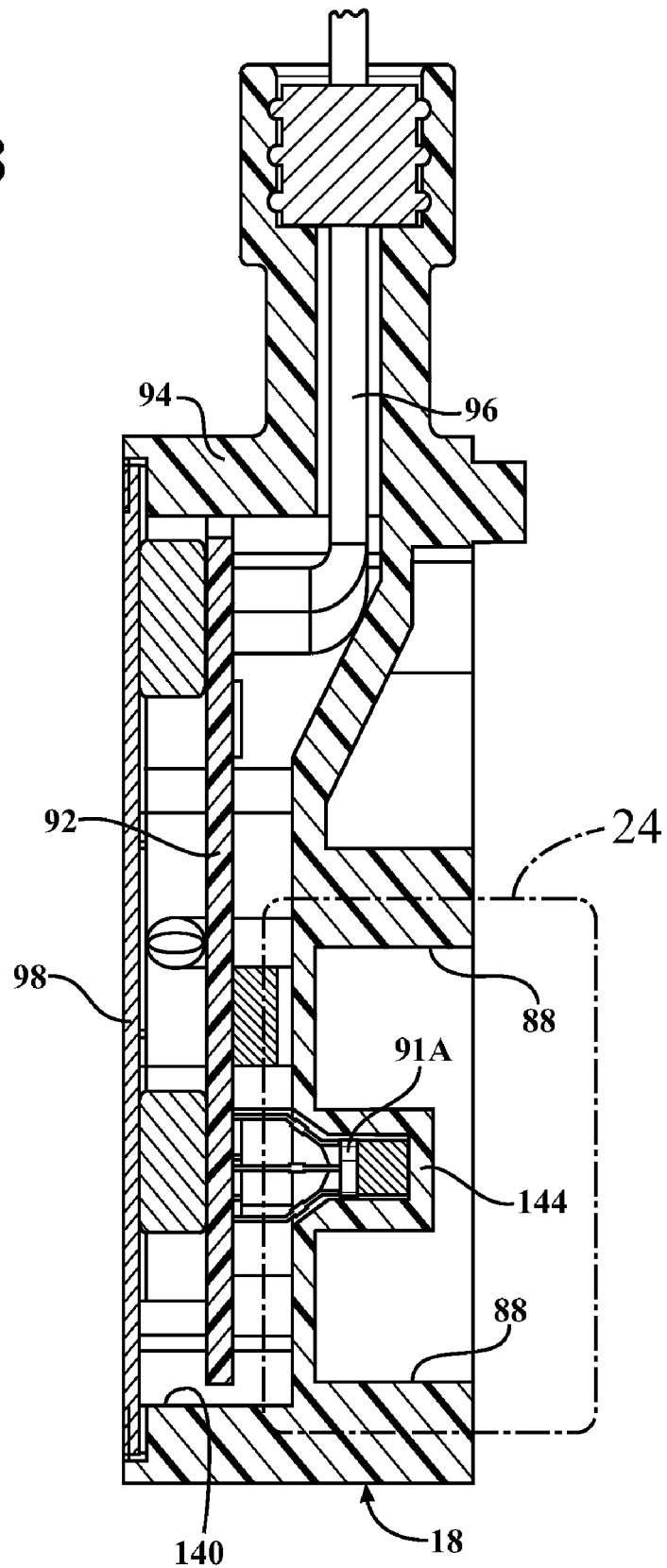
FIG. 18 is another cross-sectional view of the electronic controller taken along line 18-18 of FIG. 17.

FIG. 18 is a cross-sectional view of the sensor assembly 18. A working chamber 88 is included with sensor assembly 18 and is configured to accommodate the insertion of one or more slots 46 and/or pins 48 from mounting cap 34, the magnets 32 connected thereto, and the magnetic shield 30 substantially surrounding magnets 32. According to certain embodiments of the present invention, a first sensor 91A, which can be a Hall sensor, is included in sensor assembly 18 and extends into the working chamber 88 in sensor assembly 18.

In certain embodiments of the present invention, a second sensor 91B, which can also be a Hall sensor, is included (see FIG. 21). According to some of these embodiments, the second sensor 91B is substantially identical to, electrically isolated from and slightly offset from the above-discussed first sensor 91A. The use of two such sensors 91A, 91B positioned as described above can compensate for the fact that, in some embodiments of the present invention, a sensor cannot be placed at the exact center of rotation of rotor assembly 16 due to way that the sensor is packaged.

As illustrated in FIG. 18 a circuit board 92 is connected to a set of wires 96 that extend outside of casing 94 and that, according to certain embodiments of the present invention, are connected to a microprocessor or controller (not shown).

As will be discussed in greater detail below, according to certain embodiments of the present invention, one or more of the components in sensor assembly 18 are programmable. As such, the format or protocol of an output signal that travels through wires 96 and out of sensor assembly 18 may be switched without having to physically reconfigure any of the components in sensor assembly 18.

According to certain embodiments of the present invention, sensor assembly 18 meets or exceeds Ingress Protection 67 (IP67) standards. In other words, according to certain embodiments of the present invention, casing 94 is configured such that overall sensor assembly 18 is substantially watertight and prevents dust from interfering with the electronics of sensor assembly 18.

Figure 19A:
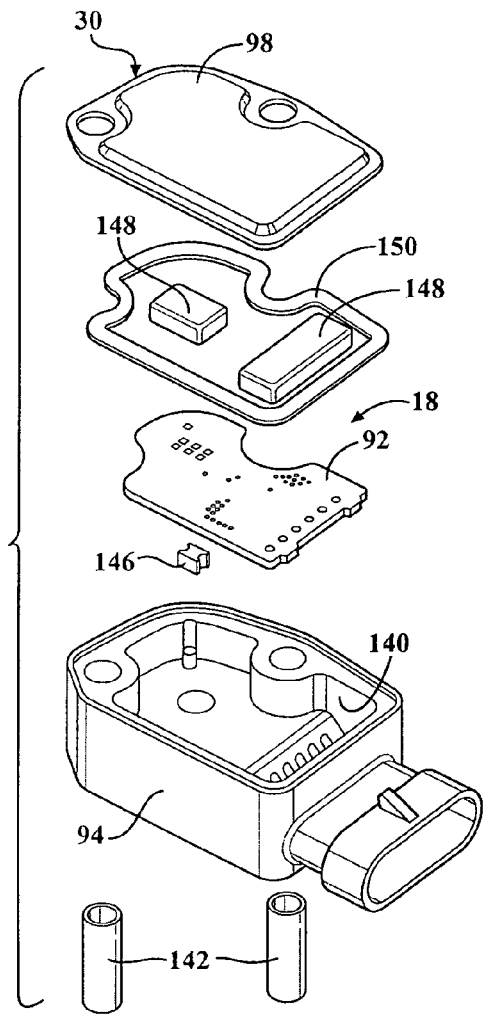
FIG. 19A is an exploded perspective view of the electronic controller.
Figure 19B:
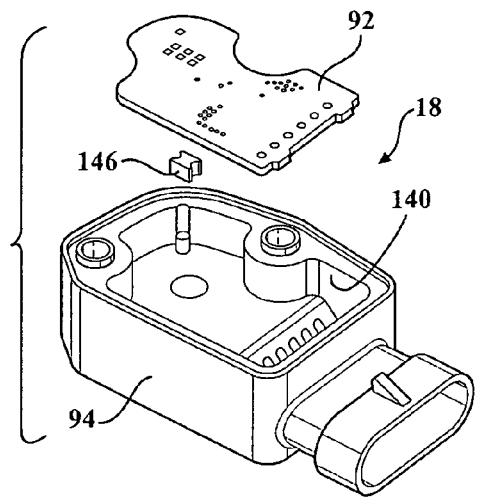
FIGS. 19B-19D are exploded perspective views of the electronic controller during assembly of the controller.
Figure 22:
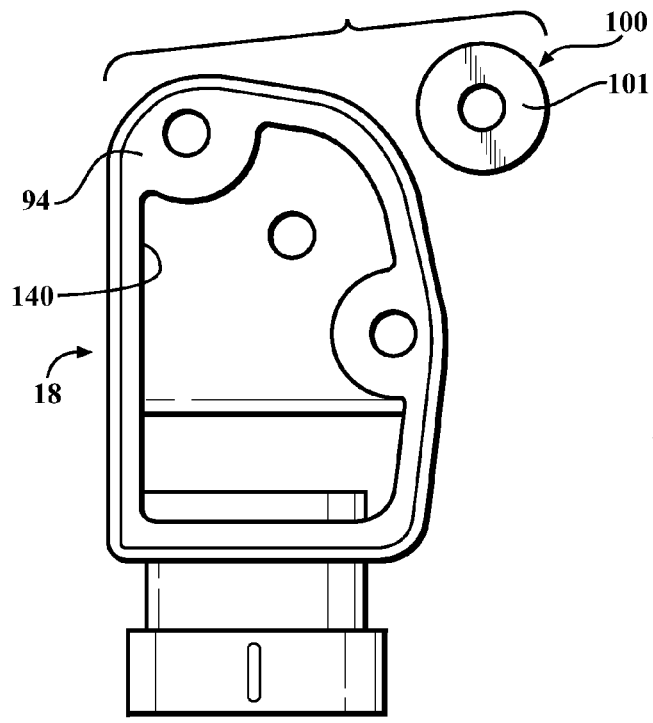
FIG. 22 is a planar view of a housing of the electronic controller before installation of a washer.
Figure 23:
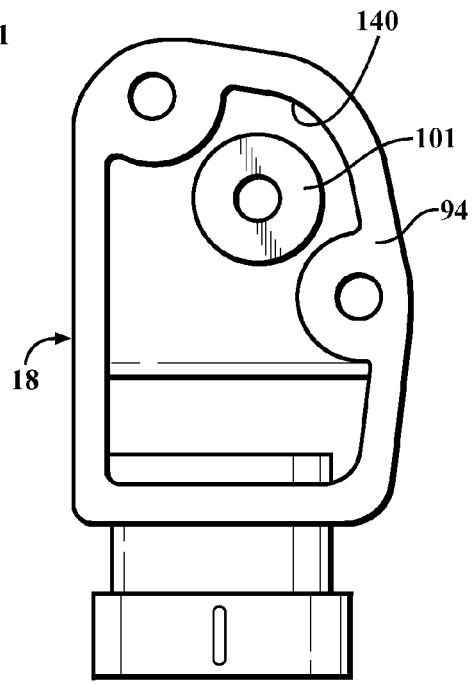
FIG. 23 is a planar view of the housing of the electronic controller after installation of the washer.

FIG. 19A is an exploded perspective view of the sensor assembly 18. In FIG. 19A, circuit board 92 is illustrated as being enclosed between casing 94 and a casing cover 98. Also, as shown in FIGS. 22 and 23, within the casing 94 and cover 98 is an additional magnetic shield 100. Additional magnetic shield 100 supplements previously discussed magnetic shield 30 in that it prevents exterior magnetic fluxes parallel to the longitudinal axis 45 (see FIG. 1) of shaft 24 from entering sensor assembly 18, whereas magnetic shield 30 protects the volume that it surrounds mainly from exterior magnetic fluxes transverse to the longitudinal axis of shaft 24. Therefore, in conjunction with magnetic shield 30 additional magnetic shield 100 illustrated in FIGS. 22 and 23 protects magnets 32 and sensors 91A, 91B positioned between the magnets 32 from exterior magnetic fluxes both in the axial and radial directions relative to rotor assembly 16.

For example, as shown in FIGS. 22 and 23, when simplicity and cost-reduction are favored, a commonly available circular metallic washer 101 may be used as additional magnetic shield 100.

According to another embodiment of the present invention, a method of monitoring a dynamic system such as, for example, the above-discussed pedal assembly 10, is provided. According to this method, a component such as, for example, treadle 22, is moved between a first position (e.g., an idle position where the vehicle that includes pedal assembly 10 is at rest) and a second position (e.g., an open throttle position where the vehicle is being accelerated). Also according to this method, a rotor such as, for example, rotor assembly 16, is rotated as the component moves between the first position and the second position. Typically, this rotating step also includes rotating an emitter (e.g., one of magnet 32, which emits a magnetic field) that is fixedly connected to the rotor.

As the rotor assembly and fixedly connected emitter are each rotated, the position of a first emitter is monitored with a sensor that is positioned adjacent to the rotor assembly. Since the sensors 91A, 91B on printed circuit board 92 are physically separated from magnets 32, and since magnets 32 are fixedly linked to treadle 22 through pedal arm 14 and rotor assembly 16, this monitoring step provides a noncontact (i.e., frictionless) method of monitoring the position of treadle 22.

According to certain embodiments of the present invention, the above method allows for the programming of the first sensor 91A to output a particular type of signal. For example, one or both of the above-discussed Hall sensors may be programmed to output a continuous analog or a discrete digital signal. As discussed above, such programmability allows for changes to be made to the dynamic system without having to physically alter any of the components included therein.

In embodiments of the present invention that include the second sensor 91B, the above method includes monitoring the position of the first emitter with the second sensor 91B, which is typically positioned adjacent to the rotor. According to these embodiments, the first signal from the first sensor 91A is processed (e.g., averaged) along with a second signal from the second sensor 91B to determine the position of the first emitter. As discussed above, the use of two sensors is particularly useful in embodiments of the present invention where the packaging of a sensor prevents the sensor from being positioned directly in the center of the rotor.

One of the advantages of certain embodiments of the present invention is that, particularly when the sensors 91A, 91B included in the dynamic system discussed above are Hall sensors, the entire system may be calibrated simply by taking a reading from sensor assembly 18 at a first position of treadle 12 (e.g., at idle) and at a second position of treadle 12 (e.g., at Wide Open Throttle (WOT)). Such convenient and rapid calibration is possible in dynamic systems according to certain embodiments of the present invention because the electronic sensors 91A, 91B used therein (e.g., Hall sensors) react substantially linearly in response to changes in the position of the emitters that they monitor. In contrast, mechanical pedals do not necessarily react linearly and tend to "loosen" over time as the components thereof wear against each other. Thus, in some mechanical pedals, complex, time-consuming calibration procedures are typically performed on a regular basis.

Another disadvantage of some mechanical pedals is that, as they wear, the range of the signal values that is emitted therefrom upon depression or release of the treadle by a user varies. For example, if a user moves a treadle from an idle position to a WOT position, an analog signal sent from the pedal assembly to a controller in the vehicle may not always stay within the same range due to linkages of the included components. For example, the treadle at idle may not always return to the same signal level.

In order to address this shortcoming of mechanical pedals, certain electronic pedal assemblies according to some embodiments of the present invention restrict the sensors included therein to emitting an output signal having a value between a first threshold value and a second threshold value. Any circuitry that becomes apparent to one of skill in the art upon practicing the present invention may be used in order to implemented such restrictions.

Figure 8:
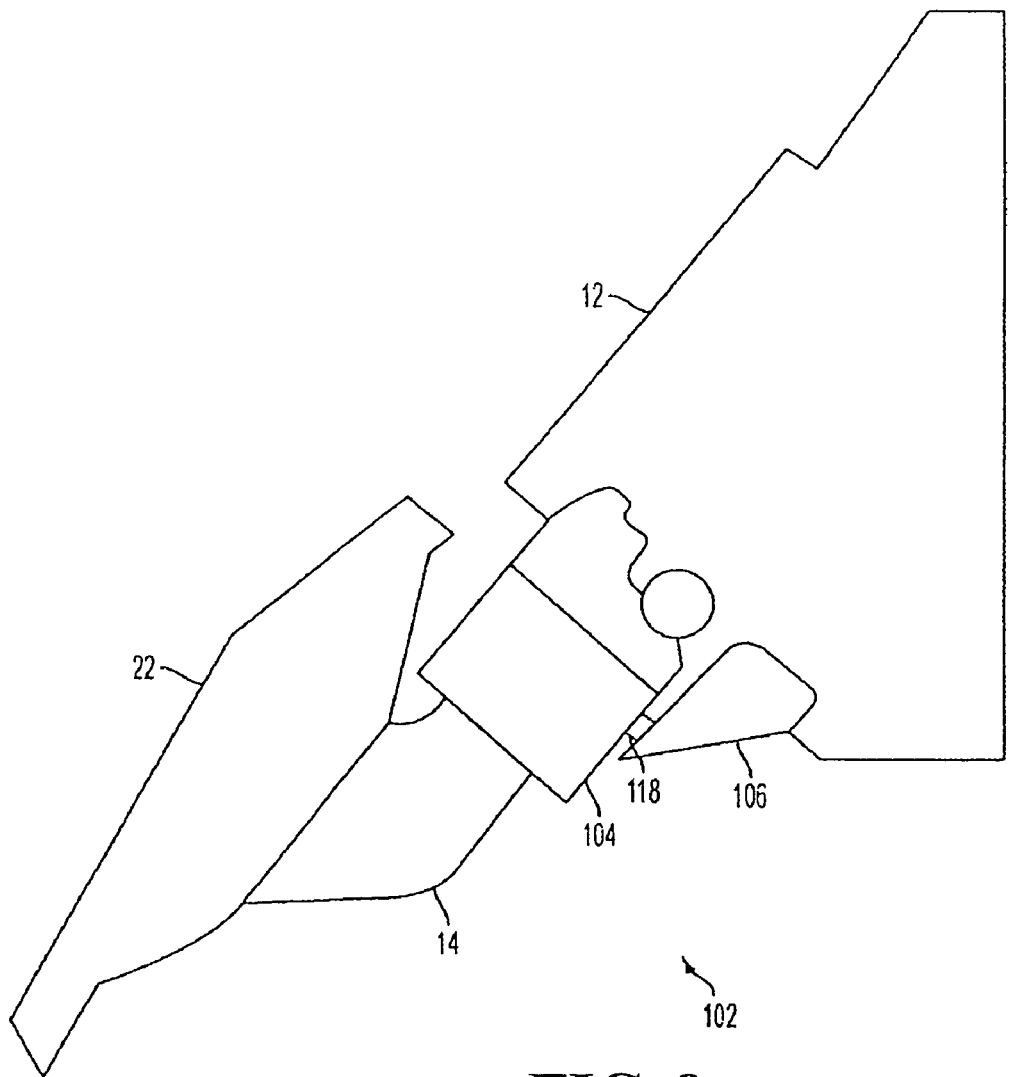
FIG. 8 is a side view of the pedal assembly illustrated in FIG. 6 wherein the kickdown mechanism is engaged with the triggering mechanism.

FIG. 8 is a side view of a pedal assembly 102 according to another embodiment of the present invention. Like the pedal assembly 10 illustrated in FIG. 1, pedal assembly 102 includes a treadle 22 that is connected to a mounting bracket 12 via a pedal arm 14. During operation of pedal assembly 102, pedal arm 14 rotates relative to bearing surfaces 38 on mounting bracket 12 (see FIG. 1).

Unlike the pedal assembly 10 illustrated in FIG. 1, pedal assembly 102 includes a resistance mechanism, referred to herein as a kickdown mechanism 104, that is attached to pedal arm 14 of pedal assembly 102. Below kickdown mechanism 104 is located a triggering mechanism 106 that, in the embodiment of the present invention illustrated in FIG. 8, takes the form of a flat plate attached to mounting bracket 12. However, alternate geometries for triggering mechanism 106 are also within the scope of the present invention.

Figure 9:
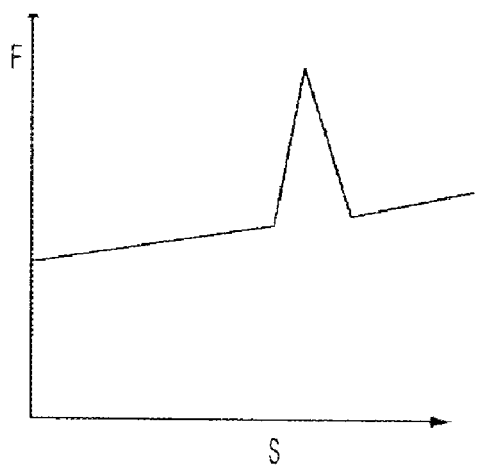
FIGS. 9-11 illustrates graphs of the amount of force needed to cause the treadle in the pedal assembly illustrated in FIG. 6 to move specified distances when three different kickdown mechanisms are attached thereto.

FIG. 9 is an exploded view of kickdown mechanism 104 illustrated in FIG. 8. As illustrated in FIG. 9, kickdown mechanism 104 includes a casing 108 configured to be attached to a pedal assembly. In FIG. 8, casing 108 of kickdown mechanism 104 is attached to pedal arm of pedal assembly 10 between treadle 22 and bearing surface 33.

Inside casing 108 is a fixed magnetic component 110. The proximate and distal ends of fixed magnetic component 110 slide into slots 112 located in a lower portion of casing 108. As such, once fixed magnetic component 110 is inserted into casing 108, it is no longer free to move.

Also inside casing 108 is a moveable magnetic component 114. The length of moveable magnetic component 114 is typically slightly less than the distance between the two interior sidewalls 116 of casing 108. Therefore, moveable magnetic component 114 is configured to slide up and down within casing 108.

Figure 10:
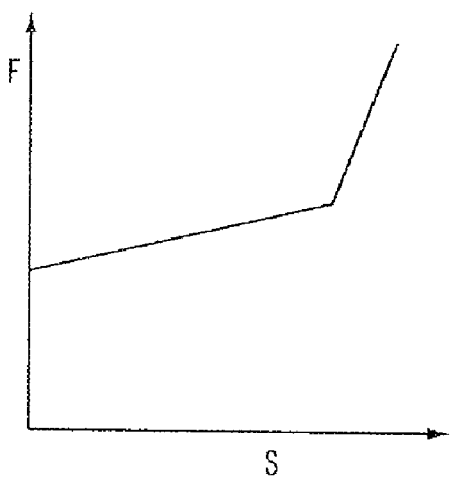

Positioned adjacent to moveable magnetic component 114 is a contact mechanism 118 that, in FIG. 9, takes the form of a plunger. As will be discussed below with reference to FIG. 10, contact mechanism 118 is configured to contact triggering mechanism 106 when treadle 22 in pedal assembly 10 is depressed beyond a predetermined position.

When all of the components in FIG. 9 are assembled, contact mechanism 118 extends through a hole 120 in fixed magnetic component 110. However, according to other embodiments of the present invention, contact mechanism 118 does not travel through any portion of fixed magnetic component 110. For example, a portion of contact mechanism 118 may travel next to fixed magnetic component 110.

Also illustrated in FIG. 9 is an elastic member 122 that is substantially enclosed within casing 108, particularly when cover 124 is attached to casing 108. Elastic member 122, which is illustrated in FIG. 9 as a spring, is positioned between moveable magnetic component 114 and an upper interior side wall 126 of casing 108 when all of the components of kickdown mechanism 104 are assembled together. According to certain embodiments of the present invention, one or both of the ends of elastic member 122 are physically connected to casing 108 and/or moveable magnetic component 114. However, according to other embodiments, the elastic member 122 is held in compression between moveable magnetic component 114 and upper interior side wall 126 and/or is confined by the interior sidewalls 116 and therefore remains unattached at either end.

According to another embodiment of the present invention, a method of altering a force needed to depress a pedal component (e.g., a treadle) as the pedal component travels along a path is provided. An example of this method will be described with reference to FIG. 8, wherein kickdown mechanism 104 is offset from triggering mechanism 106, and FIG. 10, which is a side view of pedal assembly 102 wherein kickdown mechanism 104 is engaged with triggering mechanism 106. In the discussion below, the pedal component is treadle 22 and the path is the one along which treadle 22 travels as kickdown mechanism 104 travels between the unengaged position relative to triggering mechanism 106 illustrated in FIG. 8 and the engaged position illustrated in FIG. 10.

The above-mentioned method includes providing a first resistance component to a pedal component as the pedal component travels along a first portion of a path. When implemented using pedal assembly 102, this step includes providing a first level of resistance to a user's foot as the user depresses treadle 22 from the position illustrated in FIG. 8 to a position where contact mechanism 118 just comes into contact with triggering mechanism 106. This first level of resistance may be provided, for example, using hysteresis assembly 20 in the manner discussed above with reference to pedal assembly 10.

It should be noted that the above-discussed kickdown mechanism has a variety of uses. For example, the higher level of force needed to depress the treadle further can be used to alert operators of vehicles that they may be operating the vehicle unsafely. In other words, a kickdown mechanism may be used to alert drivers of automobiles that they are speeding. As another example, kickdown mechanisms may be used to optimize fuel efficiency of a vehicle. More specifically, the force exerted by the kickdown mechanism can be use to alert a user that the vehicle is being operated outside of the most fuel-efficient range of parameters.

The method also includes supplementing the first resistance component with a second resistance component as the pedal component travels along a second portion of the path. When implementing this step using pedal assembly 102, contact mechanism 118, fixed magnetic component 110 (which is located inside of casing 108 shown in FIG. 8) and moveable magnetic component 114 (which is also located inside of casing 108) are used. More specifically, as treadle 22 keeps moving toward the position illustrated in FIG. 10 after contact mechanism 118 initially comes into contact with triggering mechanism 106, contact mechanism 118 will begin applying force to moveable magnetic component 114. In turn, since moveable magnetic component 114 is magnetically attracted to fixed magnetic component 110 moveable magnetic component 114 will resist being moved. As a result, the attractive magnetic force between moveable magnetic component 114 and fixed magnetic component 110 will provide a second resistance component of force that will have to be overcome as the motion of treadle 22 continues.

It should be noted that, as contact mechanism 118 (illustrated in FIG. 9) is driven to positions that initially force magnetic components 110 and 114 to lose direct contact with each other and that subsequently move magnetic components 110 and 114 further away from each other, the attractive magnetic force between the components diminishes. As such, certain embodiments of the above-discussed method include initially increasing and subsequently decreasing the second resistance component as the pedal component travels along the second portion of the path.

In addition to the above-discussed steps, the method also includes further supplementing the first resistance component and the second resistance component with a third resistance component as the pedal component travels along a third portion of the path. When implementing this further supplementing step using pedal assembly 102, elastic member 122 (i.e., a spring) is used to provide the third resistance component. In other words, as treadle 22 continues to move and continues to force more and more of contact mechanism 118 into casing 108, magnetic component 114 will compress elastic member 122 more and more. As a result, elastic member 122 will exert more and more mechanical spring force to resist motion of magnetic component 114 and, in turn, contact mechanism 118 and treadle 22.

Figure 11:
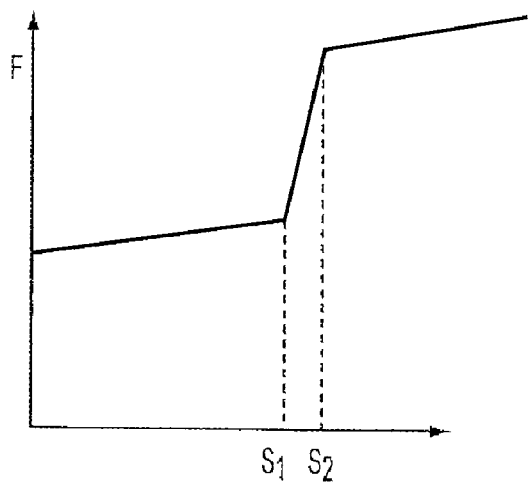
Figure 12:
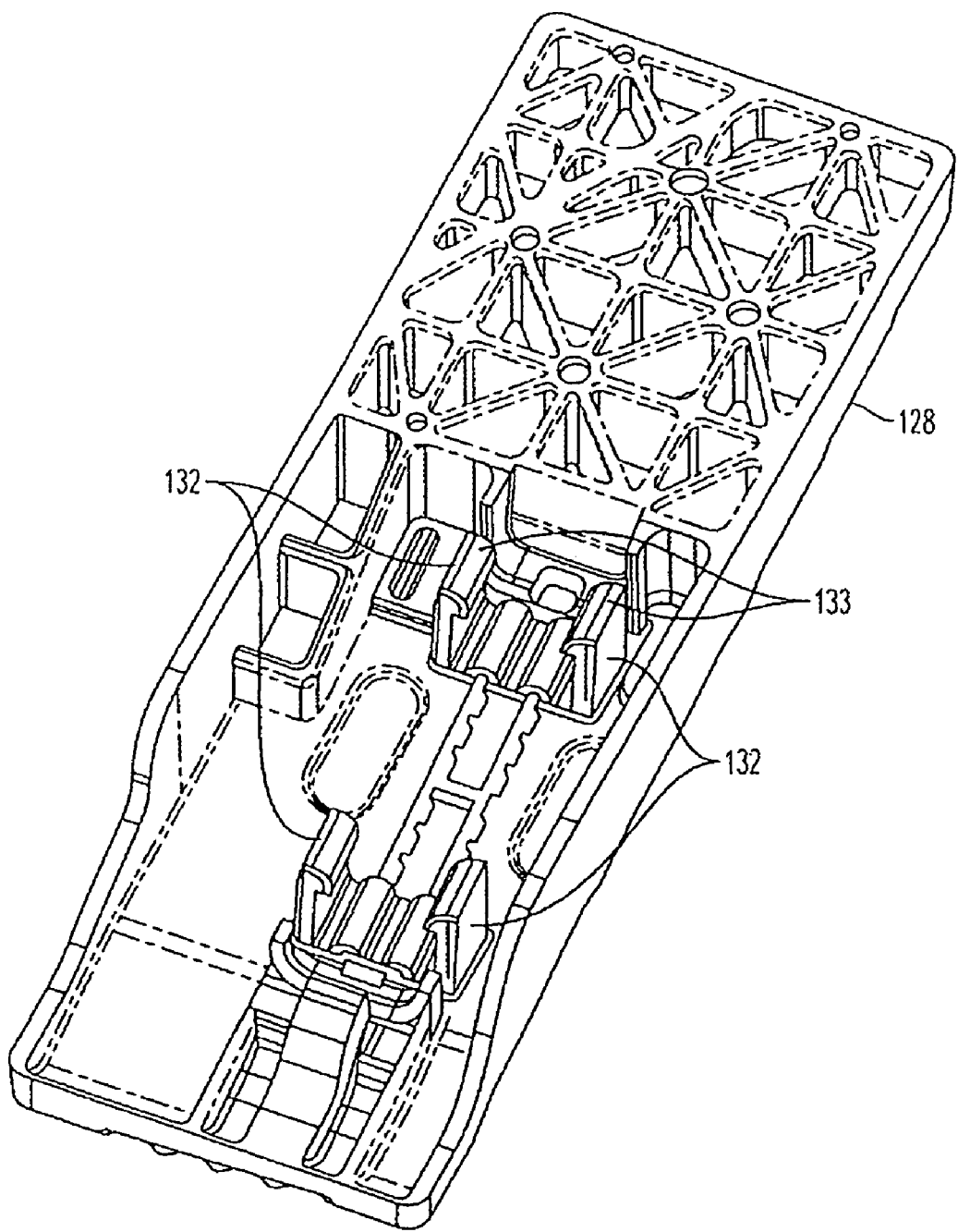
FIG. 12 is a perspective view of a bottom surface of a treadle according to an embodiment of the present invention.
Figure 13:
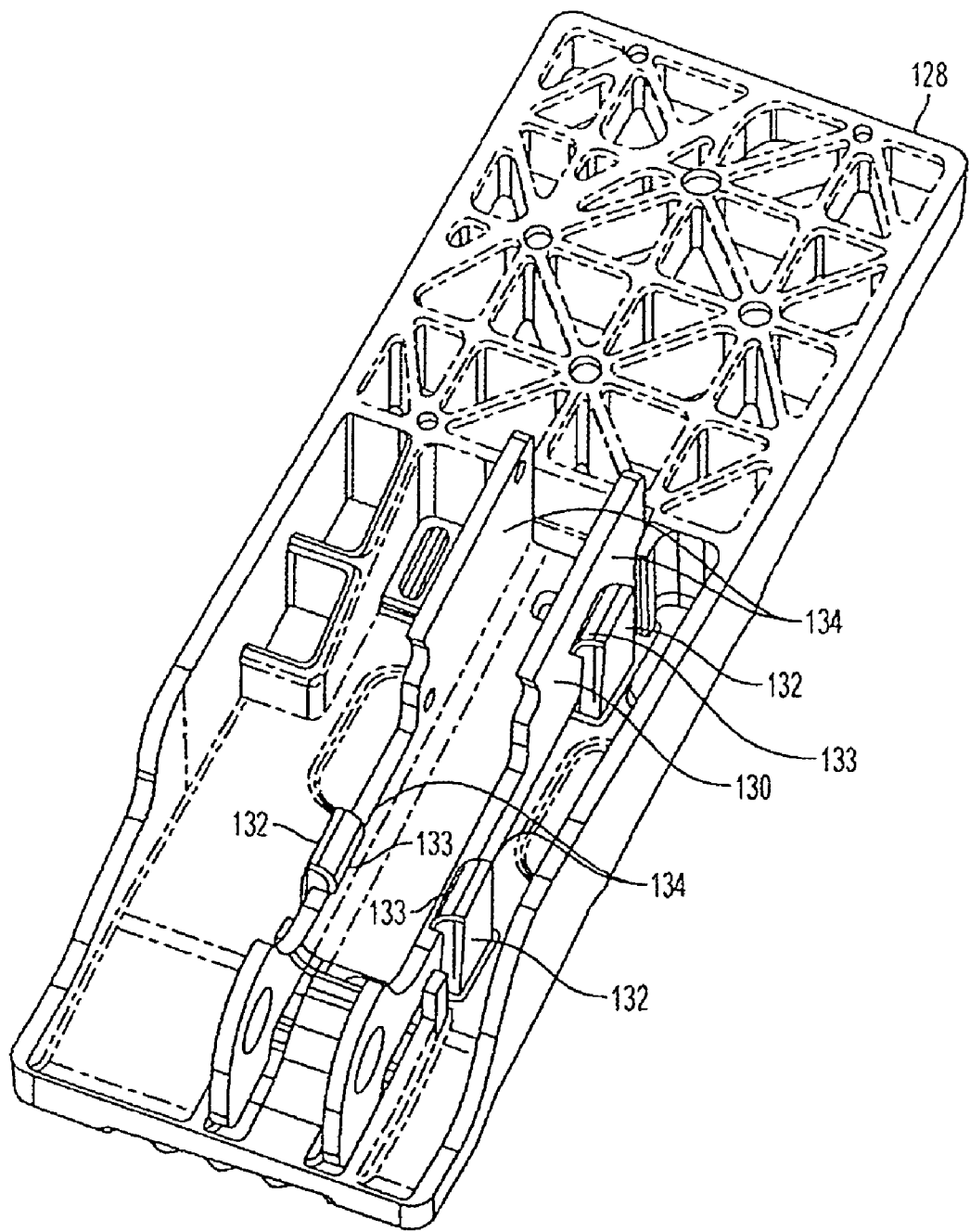
FIG. 13 is a perspective view of the treadle illustrated in FIG. 12 wherein the treadle is attached to an end of a pedal arm according to an embodiment of the present invention.

According to certain embodiments of the present invention (see FIG. 9), magnetic components 110 and 114 are not included in kickdown mechanism 104. In such embodiments, a mechanical force (from elastic member 122) provides the above-discussed second resistance component. FIGS. 11-13 each illustrate a graph of the amount of force (F) needed to cause treadle 22 in pedal assembly 102 to move specified distances (s) when three different kickdown mechanisms are attached thereto. In FIG. 11, only magnetic components 110 and 114 are included within casing 108. The amount of force needed to move treadle 22 increases sharply when the movement of contact mechanism 118 is initially impeded by the magnetic components 110 and 114. However, once the magnetic components 110 and 114 separate and move farther and farther apart, their influence on contact mechanism 118 diminishes.

The graph in FIG. 12 is generated using a kickdown mechanism that includes only elastic member 122. In such embodiments of the present invention, as the contact mechanism 118 continues to compress elastic member 122, more and more force is needed to move treadle 22 further.

The graph in FIG. 13 is generated using magnetic components 110 and 114 and elastic member 122. At a first point along the x-axis (i.e., at a distance equal to $s_1$), a position is reached where the magnetic component of resistive force produced by magnetic components 110 and 114 has to be overcome for treadle 22 to continue moving. Then, at a second point along the x-axis (i.e., at a distance equal to $s_2$), the mechanical component of resistive force has to be overcome for treadle 22 to continue moving.

Figure 14:
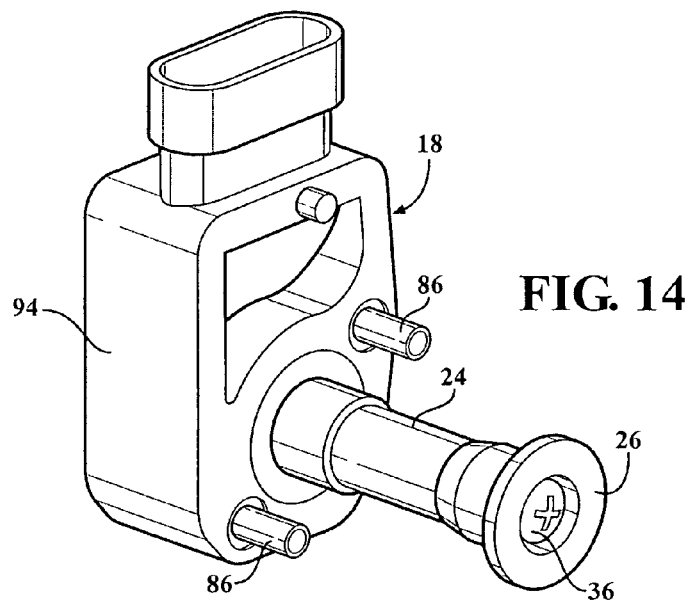
FIG. 14 is a perspective view of an electronic controller and a pivot pin.
Figure 15:
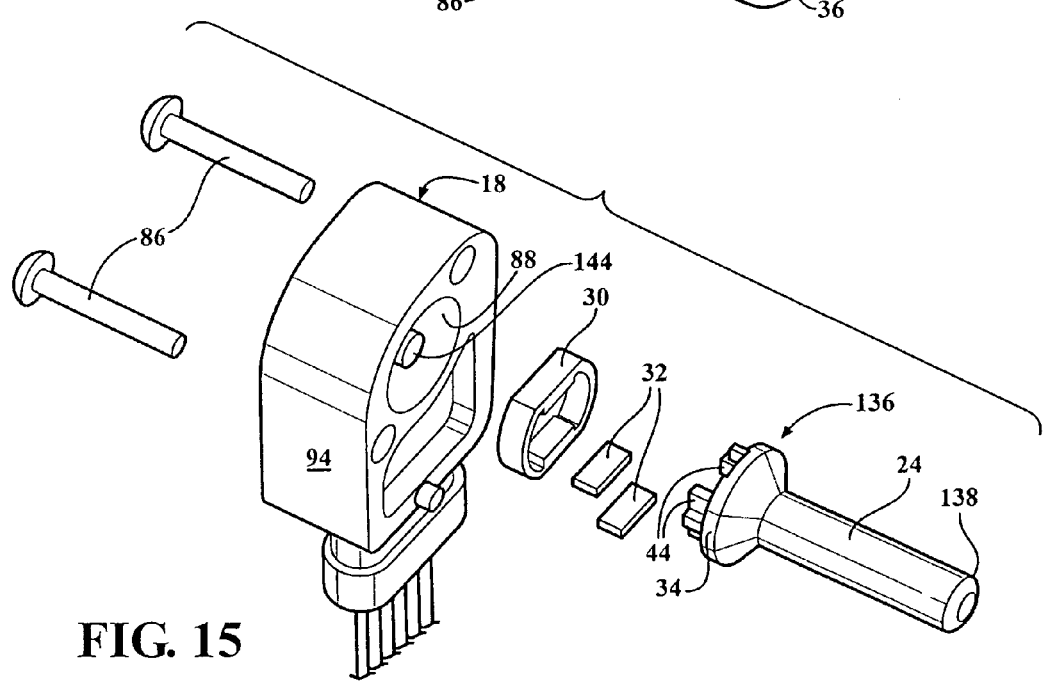
FIG. 15 is an exploded perspective view of the electronic controller, rotor, magnets, and pivot pin.

FIG. 14 is a perspective view of a bottom surface of a treadle 128 according to an embodiment of the present invention. FIG. 15 is a perspective view of treadle 128 wherein treadle 128 is attached to an end of a pedal arm 130 according to an embodiment of the present invention. As illustrated in FIG. 14, treadle 128 includes four flexible protrusions 132 and, as illustrated in FIG. 15, pedal arm 130 includes a plurality of engaging surfaces 134 configured to accommodate engagement of flexible protrusions 132 therewith.

According to certain embodiments of the present invention, protrusions 132 are each polymeric and each include a tab 133 at or near the free end thereof. According to some of these embodiments, the engaging surfaces 134 include holes, slots, depressions or other surface features into which tabs 133 may be inserted in order to secure treadle 128 to pedal arm 130.

Once treadle 128 has been secured onto pedal arm 130, protrusions 132 according to certain embodiments of the present invention are configured to incur plastic deformation upon detachment of treadle 128 from pedal arm 130. According to other embodiments of the present invention, protrusions 132 are configured to fracture upon detachment of treadle 128 from pedal arm 130. Either way, once treadle 128 has been detached, it cannot be reattached to pedal arm 130. Thus, a disincentive is provided to using potentially unsafe refurbished treadles instead of replacing a damaged treadle with a new one.

Both sets of engaging surfaces 134 illustrated in FIG. 15 are positioned substantially opposite each other. Also, both sets of protrusions 132 are positioned substantially parallel to each other. However, even a single protrusion and engaging surface combination may be used to secure a treadle to a pedal arm, and more than the four such combinations illustrated in FIG. 15 may be used. Also, the positioning of protrusions 132 relative to each other and of engaging surfaces 134 relative to each other will depend upon the geometries of the components in the pedal system that includes the treadle.

According to another embodiment of the present invention, a method of assembling a pedal is provided. The method typically includes elastically deflecting a first protrusion of a treadle a first amount. When implementing this step using treadle 128, one of the protrusions 132 may be deflected a small amount that will neither cause plastically deformation nor fracture thereof. For example, a protrusion 132 may be pressed against the edge of an engaging surface 134 on pedal arm 130 until the protrusion 132 deflects just enough to allow the tab 133 thereon to slide relative to the engaging surface 134.

The method also includes positioning the first protrusion adjacent to a first engaging surface on a pedal arm that is pivotally connected to a bracket. When implementing this step using treadle 128, the above-discussed tab 133 is slid relative to the engaging surface 134 until the tab 133 is aligned with a hole, slot or depression on the engaging surface 134.

Pursuant to the positioning step, the method includes engaging the first engaging surface with the first protrusion by reducing the first amount of deflection in the first protrusion. Again, when implementing this step using treadle 128, after deflecting the above-discussed protrusion 132 and aligning the tab 133 with the hole, slot or depression on the engaging surface 134, the tab 133 enters (i.e., engages with) the hole, slot or depression and the protrusion 132 returns to its undeflected shape.

According to certain embodiments of the present application, the method also includes elastically deflecting a second protrusion of the treadle a second amount, positioning the second protrusion adjacent to a second engaging surface on the pedal arm, wherein the second engaging surface is substantially parallel to the first engaging surface, and engaging the second engaging surface with the second protrusion by reducing the second amount of deflection in the second protrusion. Each of these steps relative to the second protrusion may be performed in a manner analogous to the corresponding steps relative to the first protrusion and, as will be appreciated by one of skill in the art upon practicing the present invention, the use of multiple protrusions and engaging surfaces more securely attaches the treadle to the pedal arm.

When, pursuant to attaching a treadle to a pedal arm, it is desired to remove the treadle, the above-discussed method also includes either plastically deforming the first protrusion upon disengagement of the first protrusion and the first engaging surface or fracturing the first protrusion upon disengagement of the first protrusion and the first engaging surface. Either way, the above-discussed used of potentially unsafe refurbished treadles is substantially prevented.

In order to implement either of these plastically deforming or fracturing steps, a number of methods may be used. For example, the above-discussed tabs 133 may be configured to engage with the above-discussed engaging surfaces 134 in such a manner no convenient method or tooling exists for extricating the tabs 133 from the engaging surfaces 134.

The sensor assembly or electronic controller 18 can be associated with any suitable control device to perform a variety of functions. For example, the electronic controller 18 could be part of a vehicle shifter assembly, hand throttle control, pedal assembly 10 or any other suitable position sensing device.

Figure 16:
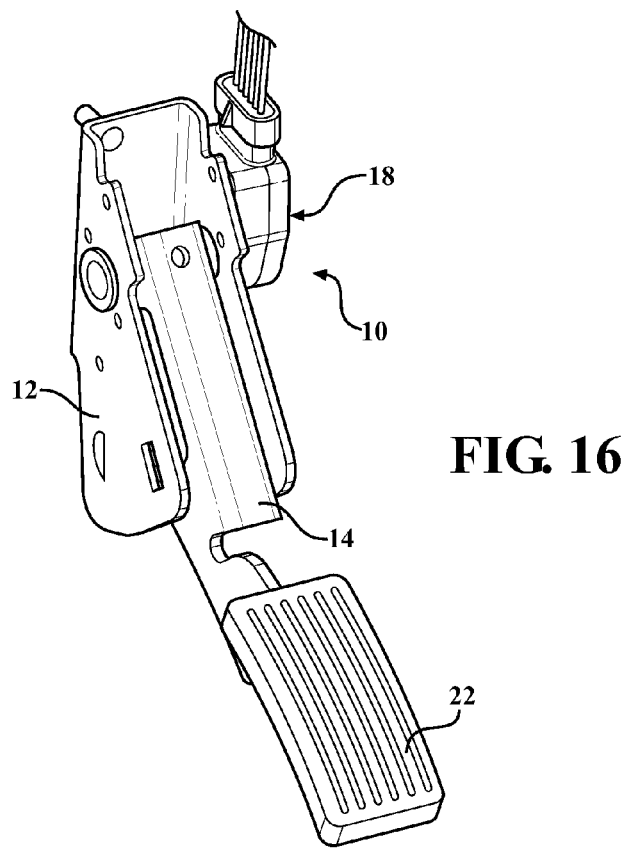
FIG. 16 is a perspective view of a pedal assembly incorporating the electronic controller.
Figure 17:
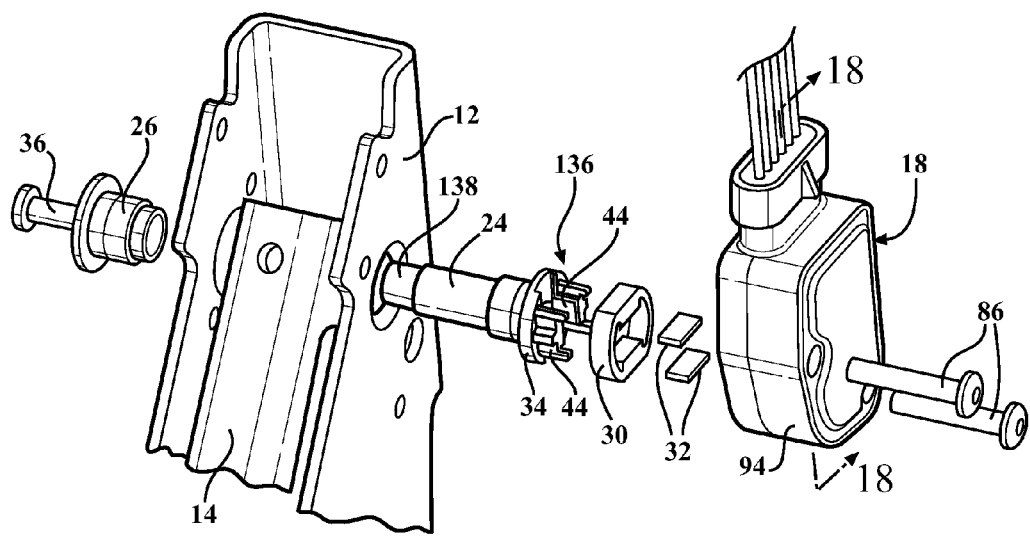
FIG. 17 is an exploded perspective view of a bracket with a rotor and a pair of magnets disposed in spaced relationship between the electronic controller and the pivot pin.

As shown in FIGS. 16 and 17, one contemplated implementation of the electronic controller 18 is shown. In particular, the electronic controller 18 is mounted directly to a mounting bracket 12 of a pedal assembly 10. The pedal assembly 10 is configured as a suspended pedal having a steel mounting bracket 12. It should be appreciated that the pedal assembly 10 shown is merely illustrative of a suitable design. Certainly, a floor mounted pedal assembly or a pedal assembly that is adjustable in fore and aft directions are contemplated as other suitable alternatives. Further, the implementation of the electronic controller 18 is in no way limited to pedal assemblies and, as discussed above, the electronic controller 18 could be associated with any suitable position sensing device.

As best shown in FIGS. 14-17 and 24, the mounting bracket 12 supports a shaft or pivot pin 24, which in turn supports a pedal arm 14. As will be discussed in greater detail below, the electronic controller 18 is disposed about a first end 136 of the pivot pin 24. The pivot pin 24 is Teflon coated such that no additional bearing material is needed.

Figure 24:
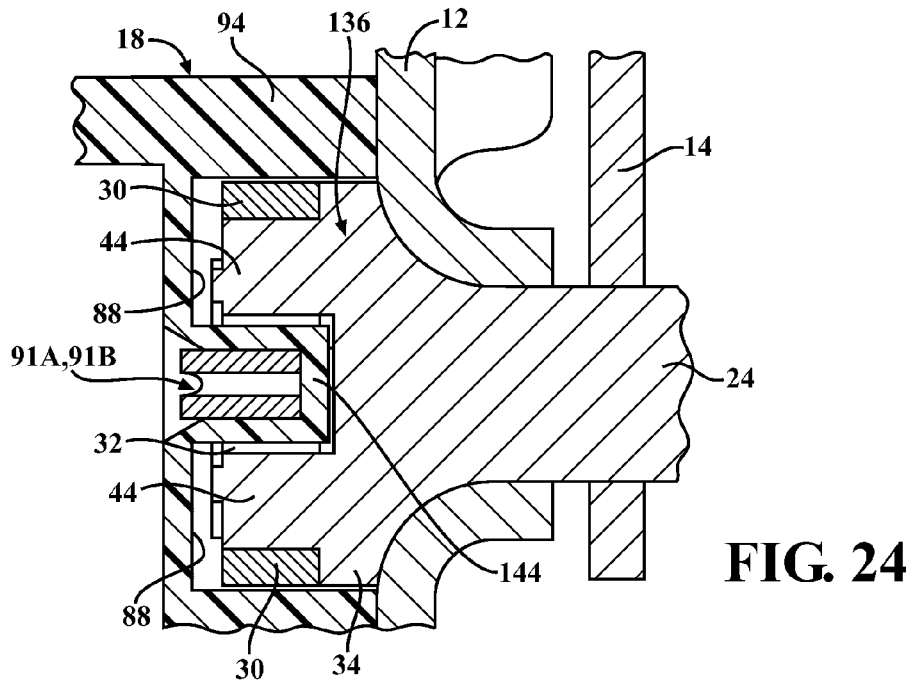
FIG. 24 is an inverted, enlarged and simplified cross-sectional view of a portion of the electronic controller as identified in FIG. 18 along with a portion of the pivot shaft disposed within a working chamber of the controller and installed on the mounting bracket.

Turning to FIGS. 15, 17 and 24, the pivot pin 24 and associated components are shown in greater detail. The pin 24 includes first 136 and second 138 ends with a cap 26 mounted to the second end 138 by a cap screw 36. The first end 136 of the pivot pin 24 extends to an opposing side of the mounting bracket 12 and into the electronic controller 18. The first end 136 includes the mounting cap or support base 34 and a pair of projecting towers 44. A shield or rotor 30 is disposed about the towers 44 and a pair of magnets 32 are inserted within indentations in the towers 44. The rotor 30 and magnets 32 installed on the pivot pin 24 provide a magnetic signal for the electronic controller 18. Preferably, once the rotor 30 and magnets 32 are installed, tabs on the towers 44 of the pivot pin 24 are heat-staked to retain these components in position. This design of the first end 136 of the pivot pin 24 creates a simplified unitary mounting for the rotating sensing components of the electronic controller 18.

Referring to FIGS. 18 and 19A-19E, the electronic controller 18 includes a casing or plastic housing 94 defining an inner cavity 140 and a working chamber 88. The casing 94 has exterior walls with an interior surface defining the inner cavity 140 within the casing 94 and the exterior walls have an exterior surface outside of the inner cavity 140 defining the working chamber 88. As shown in FIG. 19A, a pair of compression tubes 142, preferably formed of metal, extend through apertures in the housing 94 to prevent damage to the housing 94 when the housing 94 is mounted to the bracket 12 of the pedal assembly 10. A fastener 86 of any suitable design passes through the compression tubes 142 to mount the housing 94 to the control device, such as the pedal assembly 10.

The working chamber 88 has an interior wall that is preferably configured as a smooth concentric surface. The first end 136 of the pivot pin 24, which includes the rotor 30 and magnets 32, is disposed within the working chamber 88 once the electronic controller 18 is mounted to the pivot pin 24 of the pedal assembly 10 (see FIG. 24). A protrusion 144 extends from the inner cavity 140 into the working chamber 88. The protrusion 144 is hollow and defines a second inner cavity within the controller 18. The protrusion 144 is preferably disposed centrally within the working chamber 88 and is positioned between the magnets 32 when the controller 18 is mounted to the pivot pin 24.

As best shown in FIGS. 18, 19A-19D and 21, a circuit board 92 is mounted within the inner cavity 140 of the housing 94. The circuit board 92 may be of any suitable design and may include any suitable configuration of electronics as is desired. Preferably one or more hall effect sensors 91A, 91B extend from the circuit board 92 and are disposed within the second inner cavity of the protrusion 144. In the most preferred embodiment, there are a pair of hall effect sensors 91A, 91B affixed within the second inner cavity by an adhesive 146 (see FIGS. 19A and 19B), such as a urethane resin. Once assembled, the hall effect sensors 91A, 91B, which are disposed within the protrusion 144, are placed in close proximity to the magnets 32. The close proximity of the sensors 91A, 91B and magnets 32 provides excellent correlation between sensor output voltages and significantly decreases non-linearity impacts of the sensor 91A, 91B on the outputs. The positioning of the sensors 91A, 91B within the protrusion 144 also automatically aligns the hall effect sensors 91A, 91B between the magnets 32 to ensure proper operation of the electronic controller 18. Although the sensors 91A, 91B and magnets 32 are close in proximity, the sensor 91A, 91B and rotor 30/magnets 32 are completely separated and isolated from one another.

The hall effect sensors 91A, 91B may be programmed differently to recognize different dynamics or conditions. Alternatively, the hall effect sensors 91A, 91B may have common programming to provide a level of redundancy. As an example, one of the hall effect sensors 91A, 91B could be programmed to recognize a specific position of the magnets 32 or the pivot pin 24 to control an idle validation switch. The idle validation switch is preferably a solid state switch, which is capable of handling higher DC voltage than mechanical switches. The idle switch is protected against overcurrent through a polymer type resetable fuse. This fuse prevents switch damage caused by incorrect installation or accidental application of excessive current during an assembly process. The electronic controller 18 has the ability to accurately program and change a switching position to any required position of the magnets 32.

Figure 19C:
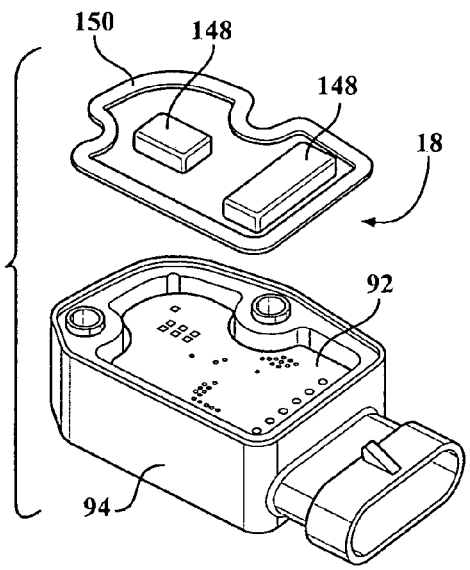
Figure 19E:
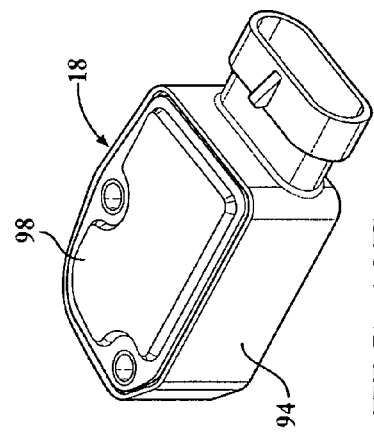
FIG. 19E is a perspective view of the electronic controller.
Figure 19D:
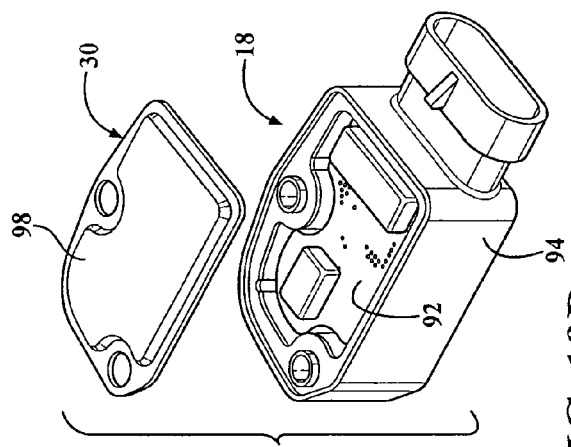

As shown in FIGS. 19A and 19C, one or more layers of protective material 148, such as silicone, are disposed on the circuit board 92 to protect the soldered components of the circuit board 92. Also, a layer of sealing material 150, which could also be silicone, is disposed about a periphery of the housing 94 to provide a seal to the housing 94.

A casing cover or shield 98 is disposed over the inner cavities of the housing 94 to close the cavities of the housing 94. The shield 98 is formed of a ferromagnetic material to prevent external magnetic fields from influencing sensor output. Alternatively, as shown in FIGS. 22 and 23, a washer 101, which is also formed of a ferromagnetic material, may be installed within the inner cavity 140 about the second inner cavity of the protrusion 140. The washer 101 would also operate to prevent external magnetic fields from influencing sensor output.

Figure 20A:
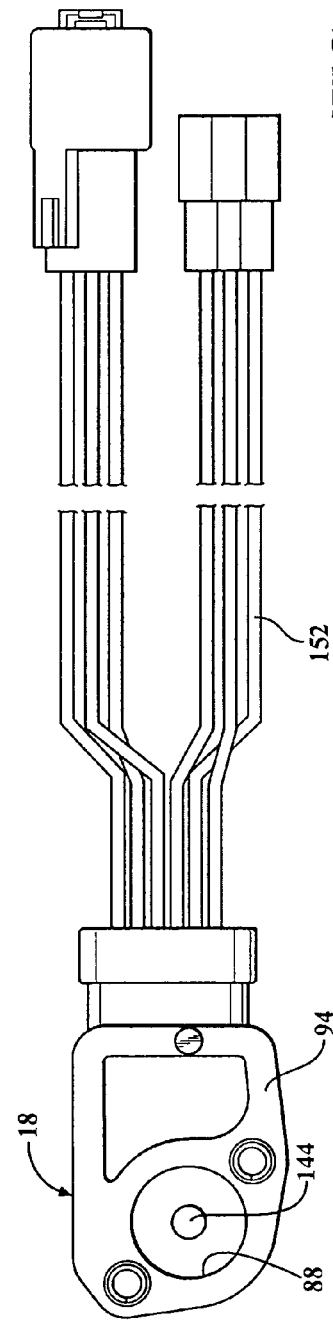
FIG. 20A is a front planar view of the electronic controller with a wiring harness mounted thereto.

As shown in FIGS. 20A-20C, the electronic controller 18 can include a suitable wiring harness 152 for connecting the electronic controller 18 to a desired component of the vehicle. Alternatively, the electronic controller 18 could include an integrated connector.

As best shown in FIG. 24, the first end 136 includes the support base 34 and the pair of projecting towers 44 with each of the towers 44 having a pair of tabs. A coil rotor 30 is first disposed about the towers 44 and a pair of magnets 32 are inserted within indentations in the towers 44. The coil rotor 30 and magnets 32 operate in conjunction with single or multiple hall effect sensors 91A, 91B to provide the desired sensing of the rotation of the pivot pin 24. Once the coil rotor 30 and magnets 32 are installed, the tabs on the first end 136 of the pivot pin 24 are heat-staked to retain these components in position. This design of the first end 136 of the pivot pin 24 creates a simplified unitary mounting for the rotating sensing components of the electronic controller 18. The coil rotor 30 and magnets 32 operate in conjunction with the hall effect sensor 91A, 91B, which is shown schematically in FIG. 24, to provide the desired sensing of the rotation of the pivot pin 24.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A dynamic system, comprising:
    a mounting bracket;
    a moveable component rotatably mounted to the mounting bracket for movement between a first position and a second position;
    a rotor assembly connected to the moveable component for concurrent movement with the moveable component between the first and second positions;
    an emitter fixedly connected to the rotor assembly;
    a casing having exterior walls with an interior surface defining an inner cavity within the casing and the exterior walls having an exterior surface outside of the inner cavity defining a working chamber such that the working chamber and the inner cavity are separated by the exterior walls the casing mounted to the mounting bracket about the rotor assembly, and a portion of the rotor assembly and the emitter being disposed within the working chamber when the casing is mounted to the mounting bracket; and
    a sensor disposed within the inner cavity of the casing and positioned adjacent to the rotor assembly and the emitter when the casing is mounted to the mounting bracket for detecting a position of the emitter.

2. The dynamic system of claim 1, wherein the moveable component is further defined as a pedal arm with a foot pedal disposed on a distal end of the pedal arm.

3. The dynamic system of claim 1, wherein the emitter comprises a magnet and wherein the sensor comprises a Hall sensor.

4. The dynamic system of claim 1, further including a flux concentrator mounted to the rotor assembly about the emitter to define an interior portion of the rotor assembly with the sensor positioned within the interior portion of the rotor assembly adjacent the emitter when the casing is mounted to the mounting bracket.

5. The dynamic system of claim 4, wherein the exterior walls of the casing further define a protrusion projecting into the working chamber and into the interior portion of the rotor assembly when the casing is mounted to the mounting bracket.

6. The dynamic system of claim 5, wherein the sensor is disposed within the protrusion to orientate the sensor within the interior portion of the rotor assembly adjacent the emitter.

7. The dynamic system of claim 6, wherein the flux concentrator includes a continuous and substantially annular shaped configuration for insertion within the working chamber about the protrusion.

8. The dynamic system of claim 6, wherein the emitter is further defined as a first emitter and further including a second emitter fixedly connected to the rotor assembly and positioned on substantially opposing sides of the protrusion.

9. The dynamic system of claim 1, further including a shield positioned proximate to the sensor and configured to prevent an exterior magnetic flux from interfering with operation of the sensor.

10. The dynamic system of claim 9, wherein the shield comprises a washer.

11. The dynamic system of claim 1, wherein the sensor is further defined as a first sensor and further including a second sensor positioned opposite the first sensor, wherein the first sensor and the second sensor are positioned on a printed circuit board configured to detect the position of the emitter.

12. The dynamic system of claim 11, further including a protrusion projecting into the working chamber with the first and second sensors disposed within the protrusion to orientate the sensors adjacent the emitter when the casing is mounted to the mounting bracket.

13. The dynamic system of claim 1, wherein the sensor can be configured to be programmed.

14. The dynamic system of claim 1, wherein the casing is substantially water-tight.

* * * * *

UNITED STATES PATENT AND TRADEMARK OFFICE
CERTIFICATE OF CORRECTION

| | | |
|---|---|---|
| PATENT NO. | : 8,240,230 B2 | Page 1 of 1 |
| APPLICATION NO. | : 11/333530 | |
| DATED | : August 14, 2012 | |
| INVENTOR(S) | : Peniston et al. | |

It is certified that error appears in the above-identified patent and that said Letters Patent is hereby corrected as shown below:

On Column 16, line 45 after "rior walls" please insert therein --,--

Signed and Sealed this
Twenty-third Day of October, 2012

David J. Kappos
*Director of the United States Patent and Trademark Office*